(12) United States Patent
Lee et al.

(10) Patent No.: US 11,693,595 B2
(45) Date of Patent: Jul. 4, 2023

(54) METHOD OF OPERATING HOST AND MEMORY SYSTEM CONNECTED THERETO

(71) Applicant: SK hynix Inc., Gyeonggi-do (KR)

(72) Inventors: Chul Woo Lee, Gyeonggi-do (KR); Jeong Hyun Kim, Gyeonggi-do (KR); Byong Woo Ryu, Gyeonggi-do (KR); Min Su Son, Gyeonggi-do (KR); Na Young Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 58 days.

(21) Appl. No.: 17/374,492

(22) Filed: Jul. 13, 2021

(65) Prior Publication Data

US 2022/0253244 A1 Aug. 11, 2022

(30) Foreign Application Priority Data

Feb. 5, 2021 (KR) .......................... 10-2021-0016972

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .............................. G06F 3/0659; G06F 3/0604
See application file for complete search history.

(56) References Cited

U.S. PATENT DOCUMENTS

| 7,536,444 B2 | 5/2009 | Kawamura et al. |
| 9,875,162 B1* | 1/2018 | Panidis ............... G06F 16/2308 |
| 9,952,805 B2 | 4/2018 | Nagao et al. |
| 2008/0028133 A1* | 1/2008 | Kwon ................. G11C 7/1078 711/E12.001 |
| 2009/0031083 A1* | 1/2009 | Willis ................. G06F 11/2092 711/135 |
| 2020/0218619 A1* | 7/2020 | Hwang ............... G06F 11/1451 |

FOREIGN PATENT DOCUMENTS

| KR | 10-2014-0069659 A | 6/2014 |
| KR | 10-2020-0040544 A | 4/2020 |

* cited by examiner

*Primary Examiner* — Gary W. Cygiel
(74) *Attorney, Agent, or Firm* — IP & T Group LLP

(57) ABSTRACT

The present technology provides a method of operating a host communicating with a memory system including a journal area and a data area. The method of operating the host includes determining to update old data stored in the memory system, transferring, to the memory system, a write command for writing journal data and meta journal data for updating the old data to the journal area, and transferring, to the memory system, a write command for writing new data corresponding to the journal data to the data area in response to a write completion of the meta journal data and the journal data received from the memory system. Each of the meta journal data and the journal data includes a descriptor identifier (ID) indicating the same write transaction.

12 Claims, 23 Drawing Sheets

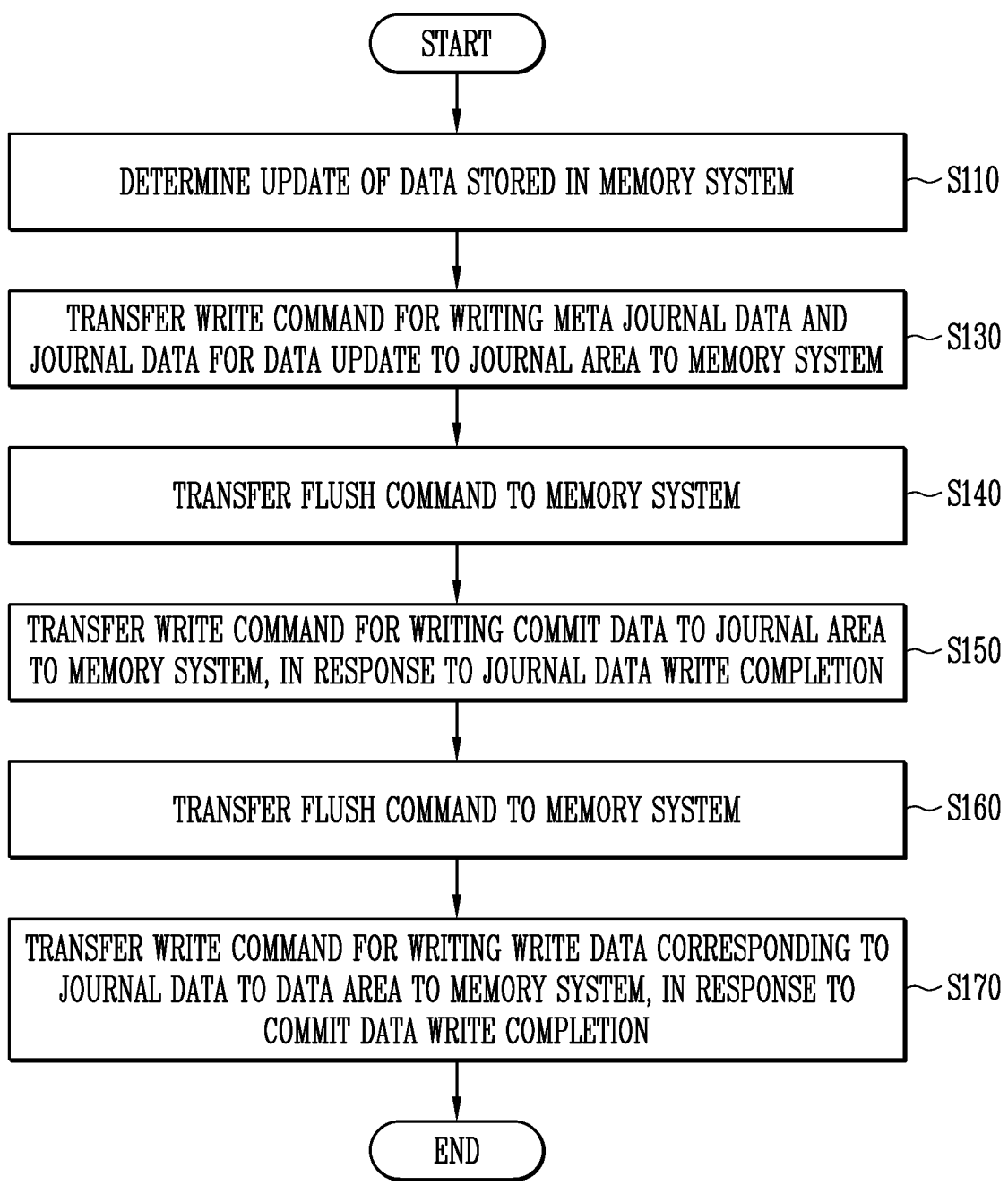

FIG. 10B
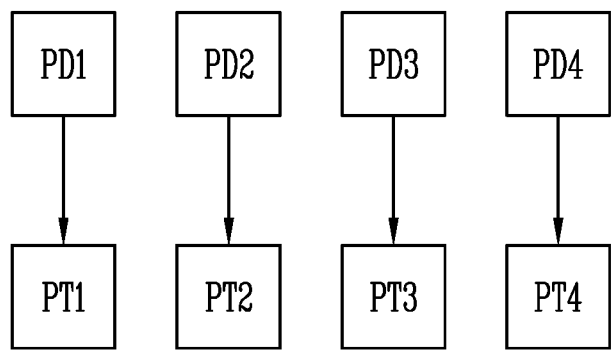
FIG. 10C
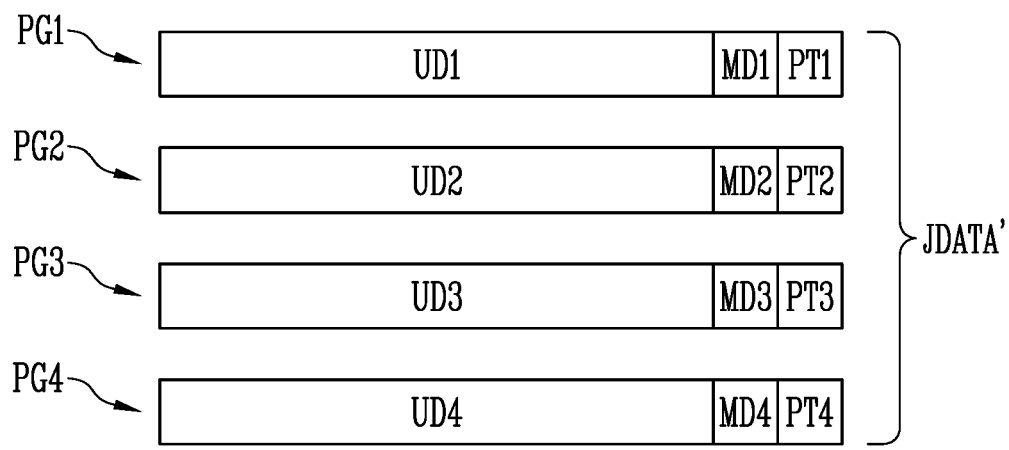

METHOD OF OPERATING HOST AND MEMORY SYSTEM CONNECTED THERETO

CROSS-REFERENCE TO RELATED APPLICATION

The present application claims priority under 35 U.S.C. § 119(a) to Korean patent application number 10-2021-0016972 filed on Feb. 5, 2021, the entire disclosure of which is incorporated by reference herein.

BACKGROUND

Field of Invention

The present disclosure relates to an electronic device, and more particularly, to a method of operating a host and a memory system connected thereto.

Description of Related Art

A host may communicate with a memory system and control an operation of the memory system. The memory system may include a semiconductor memory device and a controller.

The semiconductor memory device may be formed in a two-dimensional structure in which strings are horizontally arranged on a semiconductor substrate, or in a three-dimensional structure in which the strings are vertically stacked on the semiconductor substrate. A three-dimensional semiconductor memory device is a semiconductor memory device designed in order to resolve a limit of integration degree of a two-dimensional semiconductor memory device, and may include a plurality of memory cells that are vertically stacked on a semiconductor substrate.

The controller may control an operation of the semiconductor memory device.

SUMMARY

An embodiment of the present disclosure provides a host and a method of operating the same capable of improving a write speed of a memory system.

According to an embodiment of the present disclosure, a method of operating a host communicating with a memory system including a journal area and a data area includes determining to update old data stored in the memory system, transferring, to the memory system, a write command for writing journal data and meta journal data for updating the old data to the journal area, and transferring, to the memory system, a write command for writing new data corresponding to the journal data to the data area in response to a write completion of the meta journal data and the journal data received from the memory system. Each of the meta journal data and the journal data includes a descriptor identifier (ID) indicating the same write transaction.

In an embodiment of the present disclosure, the method may further include controlling the memory system to invalidate the old data stored in the data area, in response to the write completion of the new data received from the memory system.

In an embodiment of the present disclosure, the method may further include detecting a sudden power-off of the memory system, reading meta journal data and journal data stored in the journal area, and controlling the memory system to recover a write operation before the sudden power-off based on the meta journal data and the journal data.

In an embodiment of the present disclosure, the controlling the memory system to recover the write operation before the sudden power-off based on the meta journal data and the journal data may include comparing the descriptor ID of the meta journal data with the descriptor ID of the journal data, and controlling the memory system to write the journal data of the journal area to the data area when the descriptor ID of the meta journal data is the same as the descriptor ID of the journal data.

According to another embodiment of the present disclosure, a method of operating a host communicating with a memory system including a journal area and a data area includes detecting a sudden power-off of the memory system, reading meta journal data and journal data stored in the journal area, and controlling the memory system to recover a write operation before the sudden power-off, based on the meta journal data and the journal data. Each of the meta journal data and the journal data includes a descriptor identifier (ID) that identifies a transaction including corresponding data.

In an embodiment of the present disclosure, the controlling of the memory system to recover the write operation before the sudden power-off, based on the meta journal data and the journal data may include determining whether the descriptor ID of the meta journal data and the descriptor ID of the journal data are identical to each other.

In an embodiment of the present disclosure, the controlling of the memory system to recover the write operation before the sudden power-off, based on the meta journal data and the journal data may further include controlling the memory system to write the journal data of the journal area to the data area, in response to a determination that the descriptor ID of the meta journal data and the descriptor ID of the journal data are identical to each other.

In an embodiment of the present disclosure, the controlling of the memory system to recover the write operation before the sudden power-off, based on the meta journal data and the journal data may further include controlling the memory system to delete or invalidate the meta journal data and the journal data in the journal area, in response to a determination that the descriptor ID of the meta journal data and the descriptor ID of the journal data are not identical to each other.

In an embodiment of the present disclosure, the journal data may include first page data and second page data, the first page data may include first partial data and first parity data, and the second page data may include second partial data and second parity data. The first parity data may be generated based on the first partial data, and the second parity data may be generated based on the first partial data and the second partial data. Controlling the memory system to recover the write operation before the sudden power-off, based on the meta journal data and the journal data may include determining whether a parity check of the journal data has passed.

In an embodiment of the present disclosure, the controlling of the memory system to recover the write operation before the sudden power-off, based on the meta journal data and the journal data may further include controlling the memory system to write the journal data of the journal area to the data area, in response to a determination that the parity check of the journal data has passed.

In an embodiment of the present disclosure, the controlling of the memory system to recover the write operation before the sudden power-off, based on the meta journal data and the journal data may further include controlling the memory system to delete or invalidate the meta journal data and the journal data of the journal area, in response to a determination that the parity check of the journal data has not passed.

According to further another embodiment of the present disclosure, a method of operating a memory system including a journal area and a data area includes receiving, from a host, write data and a write command, and writing journal data generated based on the write data in the journal area. The write data includes first to N-th partial data, and the journal data includes first to N-th page data. The i-th page data among the first to N-th page data includes i-th partial data among the first to N-th partial data and i-th parity data among the first to N-th parity data. The i-th parity data is generated based on at least one of the first to (i−1)-th partial data and the i-th partial data. Here, N is a natural number greater than 1, and i is a natural number greater than or equal to 1 and less than or equal to N.

In an embodiment of the present disclosure, the i-th parity data may be generated by a cyclic redundancy check method for at least one of the first to (i−1)-th partial data and the i-th partial data.

In an embodiment of the present disclosure, the i-th parity data may be generated based on the first to i-th partial data.

In an embodiment of the present disclosure, the i-th parity data may be generated by a cyclic redundancy check method for the first to i-th partial data.

The present technology may provide a host and a method of operating the same capable of improving a write speed of a memory system.

According to further another embodiment of the present disclosure, a system comprises a host and a memory system coupled to the host. The memory system includes a controller, and a memory device coupled to the controller. The memory device includes a journal area and a data area. The controller is configured to control the memory device to write journal data and meta journal data in the journal area with descriptors, read the journal data and the meta journal data from the journal area when a sudden power-off is detected, determine whether a descriptor of the meta journal data is the same as a descriptor of the journal data and write the journal data of the journal area to the data area when it is determined that the descriptor of the meta journal data is the same as the descriptor of the journal data.

In an embodiment of the present disclosure, the controller may be configured to control the memory device to delete the journal data in the journal area when it is determined that the descriptor of the meta journal data is different from the descriptor of the journal data.

BRIEF DESCRIPTION OF THE DRAWINGS

FIG. 8 is a flowchart illustrating a method of operating a host according to an embodiment of the present disclosure.

FIGS. 10A, 10B, and 10C are diagrams illustrating a structure of data written to the journal area or the data area by the method shown in FIG. 8 according to an embodiment of the present disclosure.

DETAILED DESCRIPTION

Specific structural or functional descriptions of embodiments according to the concept which are disclosed in the present specification or application are illustrated only to describe the embodiments according to the present disclosure. The embodiments according to the present disclosure may be carried out in various forms and should not be construed as being limited to the embodiments described in the present specification.

Figure 1:
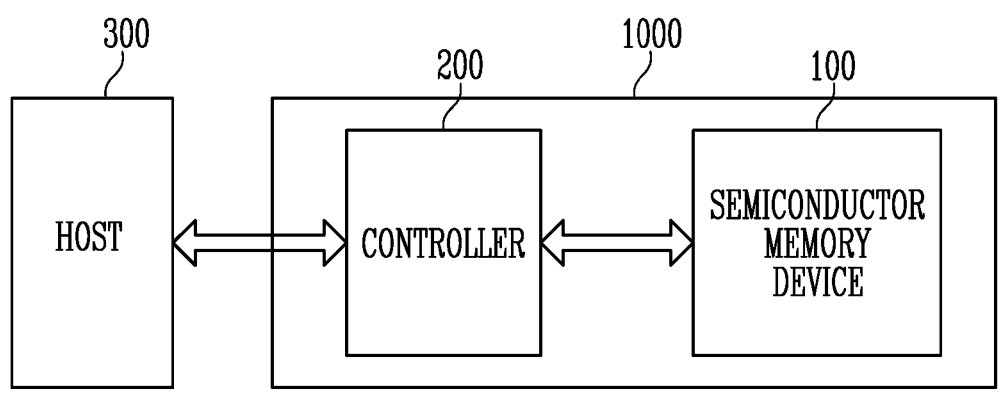
FIG. 1 is a block diagram illustrating a host and a memory system communicating with the host according to an embodiment of the present disclosure.

FIG. 1 is a block diagram illustrating a host 300 and a memory system 1000 communicating with the host 300 according to an embodiment of the present disclosure.

Referring to FIG. 1, the memory system 1000 includes a semiconductor memory device 100 and a controller 200. In addition, the memory system 1000 communicates with the host 300. The controller 200 controls an overall operation of the semiconductor memory device 100. In addition, the controller 200 controls the operation of the semiconductor memory device 100 based on a command received from the host 300.

The host 300 may control an operation of the memory system 1000. For example, the host 300 may transfer a write command and data to the memory system 1000. The memory system 1000 may store the data in the semiconductor memory device 100 based on the received write command. As another example, the host 300 may transfer a read command to the memory system 1000. The memory system 1000 may read the data stored in the semiconductor memory device 100 based on the received read command. In addition, the memory system 1000 may transfer the read data to the host 300.

Figure 2:
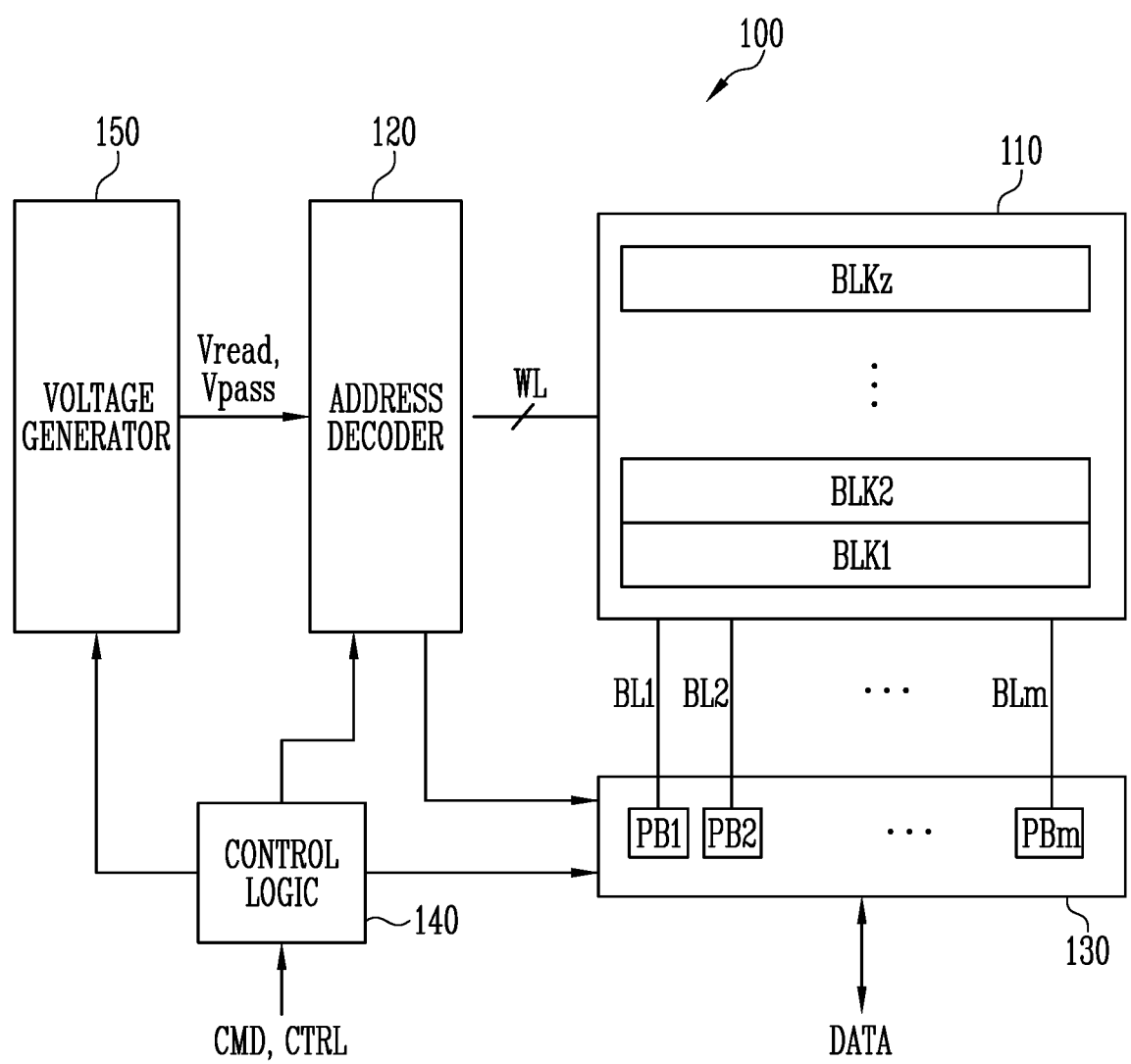
FIG. 2 is a block diagram illustrating a semiconductor memory device included in the memory system of FIG. 1 according to an embodiment of the present disclosure.

FIG. 2 is a block diagram illustrating the semiconductor memory device 100 included in the memory system 1000 of FIG. 1 according to an embodiment of the present disclosure.

Referring to FIG. 2, the semiconductor memory device 100 includes a memory cell array 110, an address decoder 120, a read and write circuit 130, a control logic 140, and a voltage generator 150.

The memory cell array 110 includes a plurality of memory blocks BLK1 to BLKz. The plurality of memory blocks BLK1 to BLKz are connected to the address decoder 120 through word lines WL. The plurality of memory blocks BLK1 to BLKz are connected to the read and write circuit 130 through bit lines BL1 to BLm. Each of the plurality of memory blocks BLK1 to BLKz includes a plurality of memory cells. In an embodiment, the plurality of memory cells are non-volatile memory cells, and may be configured of non-volatile memory cells having a vertical channel structure. The memory cell array 110 may be configured as a memory cell array of a two-dimensional structure. According to an embodiment, the memory cell array 110 may be configured as a memory cell array of a three-dimensional structure. Each of the plurality of memory cells included in the memory cell array may store at least one bit of data. In an embodiment, each of the plurality of memory cells included in the memory cell array 110 may be a single-level cell (SLC) storing one bit of data. In another embodiment, each of the plurality of memory cells included in the memory cell array 110 may be a multi-level cell (MLC) storing two bits of data. In still another embodiment, each of the plurality of memory cells included in the memory cell array 110 may be a triple-level cell (TLC) storing three bits of data. In still another embodiment, each of the plurality of memory cells included in the memory cell array 110 may be a quad-level cell (QLC) storing four bits of data. According to an embodiment, the memory cell array 110 may include a plurality of memory cells each storing five or more bits of data.

The address decoder 120, the read and write circuit 130, the control logic 140, and the voltage generator 150 operate as a peripheral circuit that drives the memory cell array 110. The address decoder 120 is connected to the memory cell array 110 through the word lines WL. The address decoder 120 is configured to operate in response to control of the control logic 140. The address decoder 120 receives an address through an input/output buffer (not shown) inside the semiconductor memory device 100.

The address decoder 120 is configured to decode a block address among received addresses. The address decoder 120 selects at least one memory block according to the decoded block address. In addition, the address decoder 120 applies a read voltage Vread generated by the voltage generator 150 to a selected word line of the selected memory block at a time of a read voltage application operation during a read operation, and applies a pass voltage Vpass to the remaining unselected word lines. In addition, during a program verify operation, the address decoder 120 applies a verify voltage generated by the voltage generator 150 to the selected word line of the selected memory block, and applies the pass voltage Vpass to the remaining unselected word lines.

The address decoder 120 is configured to decode a column address of the received addresses. The address decoder 120 transmits the decoded column address to the read and write circuit 130.

A read operation and a program operation of the semiconductor memory device 100 are performed in a page unit. Addresses received at a time of a request of the read operation and the program operation include a block address, a row address, and a column address. The address decoder 120 selects one memory block and one word line according to the block address and the row address. The column address is decoded by the address decoder 120 and is provided to the read and write circuit 130.

The address decoder 120 may include a block decoder, a row decoder, a column decoder, an address buffer, and the like.

The read and write circuit 130 includes a plurality of page buffers PB1 to PBm. The read and write circuit 130 may operate as a "read circuit" during a read operation of the memory cell array 110 and may operate as a "write circuit" during a write operation of the memory cell array 110. The plurality of page buffers PB1 to PBm are connected to the memory cell array 110 through the bit lines BL1 to BLm. During the read operation and the program verify operation, in order to sense a threshold voltage of the memory cells, the plurality of page buffers PB1 to PBm sense a change of an amount of a current flowing according to a program state of a corresponding memory cell through a sensing node while continuously supplying a sensing current to the bit lines connected to the memory cells, and latches the sensed change as sensing data. The read and write circuit 130 operates in response to page buffer control signals output from the control logic 140.

During the read operation, the read and write circuit 130 senses data of the memory cell, temporarily stores read data, and outputs data DATA to the input/output buffer (not shown) of the semiconductor memory device 100. In an embodiment, the read and write circuit 130 may include a column selection circuit, and the like, in addition to the page buffers (or page registers).

The control logic 140 is connected to the address decoder 120, the read and write circuit 130, and the voltage generator 150. The control logic 140 receives a command CMD and a control signal CTRL through the input/output buffer (not shown) of the semiconductor memory device 100. The control logic 140 is configured to control overall operations of the semiconductor memory device 100 in response to the control signal CTRL. In addition, the control logic 140 outputs a control signal for adjusting a sensing node precharge potential level of the plurality of page buffers PB1 to PBm. The control logic 140 may control the read and write circuit 130 to perform the read operation of the memory cell array 110.

The voltage generator 150 generates the read voltage Vread and the pass voltage Vpass during the read operation in response to the control signal output from the control logic 140. In order to generate a plurality of voltages having various voltage levels, the voltage generator 150 may include a plurality of pumping capacitors that receive an internal power voltage, and generate the plurality of voltages by selectively activating the plurality of pumping capacitors in response to the control of the control logic 140. As described above, the voltage generator 150 may include the charge pump, and the charge pump may include the plurality of pumping capacitors described above. A specific configuration of the charge pump included in the voltage generator 150 may be variously designed as necessary.

The address decoder 120, the read and write circuit 130, and the voltage generator 150 may function as a "peripheral circuit" that performs a read operation, a write operation, and an erase operation on the memory cell array 110. The peripheral circuit performs the read operation, the write operation, and the erase operation on the memory cell array 110 based on the control of the control logic 140.

Figure 3:
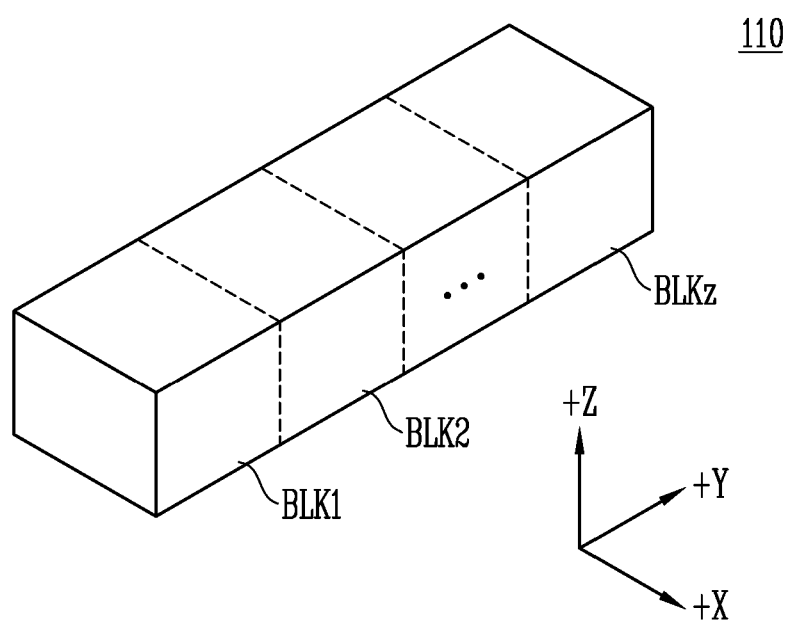
FIG. 3 is a diagram illustrating f a memory cell array of FIG. 2 according to an embodiment of the present disclosure.

FIG. 3 is a diagram illustrating an embodiment of the memory cell array 110 of FIG. 2 according to an embodiment of the present disclosure.

Referring to FIG. 3, the memory cell array 110 includes a plurality of memory blocks BLK1 to BLKz. Each memory block may have a three-dimensional structure. Each memory block includes a plurality of memory cells stacked on a substrate. The plurality of memory cells are arranged along a +X direction, a +Y direction, and a +Z direction. A structure of each memory block is described in more detail with reference to FIGS. 4 and 5.

Figure 4:
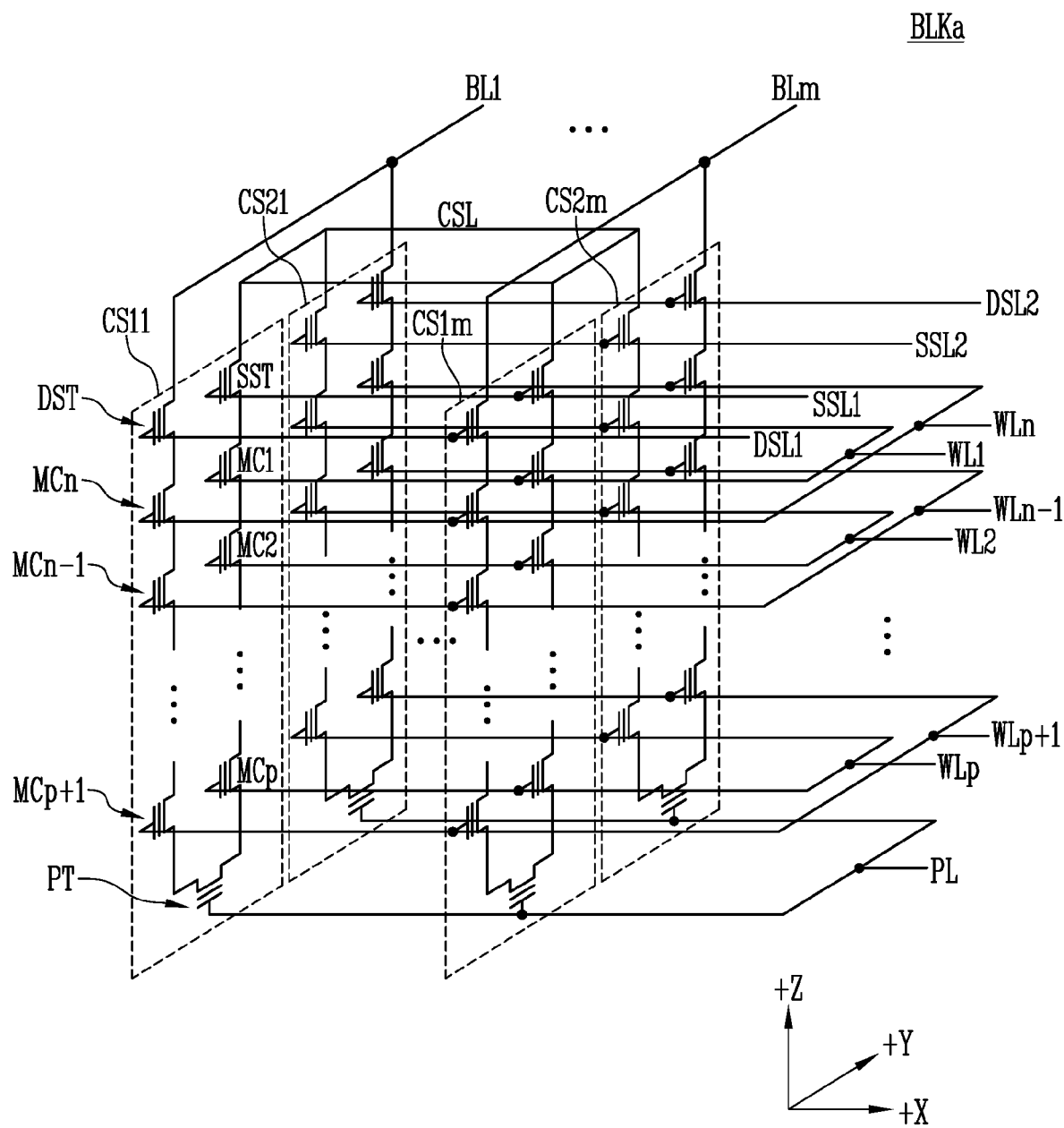
FIG. 4 is a circuit diagram illustrating a memory block BLKa of memory blocks BLK1 to BLKz of FIG. 3 according to an embodiment of the present disclosure.

FIG. 4 is a circuit diagram illustrating a memory block BLKa of the memory blocks BLK1 to BLKz of FIG. 3 according to an embodiment of the present disclosure.

Referring to FIG. 4, the memory block BLKa includes a plurality of cell strings CS11 to CS1$m$ and CS21 to CS2$m$. In an embodiment, each of the plurality of cell strings CS11 to CS1$m$ and CS21 to CS2$m$ may be formed in a 'U' shape. In the memory block BLKa, m cell strings are arranged in a row direction (that is, the +X direction). In FIG. 4, two cell strings are arranged in a column direction (that is, the +Y direction). However, this is for convenience of description and it may be understood that three or more cell strings may be arranged in the column direction.

Each of the plurality of cell strings CS11 to CS1$m$ and CS21 to CS2$m$ includes at least one source select transistor SST, first to n-th memory cells MC1 to MCn, a pipe transistor PT, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating film, a charge storage film, and a blocking insulating film. In an embodiment, a pillar for providing the channel layer may be provided in each cell string. In an embodiment, a pillar for providing at least one of the channel layer, the tunneling insulating film, the charge storage film, and the blocking insulating film may be provided in each cell string.

The source select transistor SST of each cell string is connected between a common source line CSL and the memory cells MC1 to MCp.

In an embodiment, the source select transistors of the cell strings arranged in the same row are connected to a source select line extending in the row direction, and the source select transistors of the cell strings arranged in different rows are connected to different source select lines. In FIG. 4, the source select transistors of the cell strings CS11 to CS1$m$ of a first row are connected to a first source select line SSL1. The source select transistors of the cell strings CS21 to CS2$m$ of a second row are connected to a second source select line SSL2.

In another embodiment, the source select transistors of the cell strings CS11 to CS1$m$ and CS21 to CS2$m$ may be commonly connected to one source select line.

The first to n-th memory cells MC1 to MCn of each cell string are connected between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp are sequentially arranged in a direction opposite to the +Z direction, and are connected in series between the source select transistor SST and the pipe transistor PT. The (p+1)-th to n-th memory cells MCp+1 to MCn are sequentially arranged in the +Z direction, and are connected in series between the pipe transistor PT and the drain select transistor DST. The first to p-th memory cells MC1 to MCp and the (p+1)-th to n-th memory cells MCp+1 to MCn are connected to each other through the pipe transistor PT. Gates of the first to n-th memory cells MC1 to MCn of each cell string are connected to the first to n-th word lines WL1 to WLn, respectively.

A gate of the pipe transistor PT of each cell string is connected to a pipeline PL.

The drain select transistor DST of each cell string is connected between a corresponding bit line and the memory cells MCp+1 to MCn. The drain select transistor DST of cell strings arranged in the row direction are connected to the drain select line extending in the row direction. The drain select transistors of the cell strings CS11 to CS1$m$ of the first row are connected to a first drain select line DSL1. The drain select transistors of the cell strings CS21 to CS2$m$ of the second row are connected to a second drain select line DSL2.

The cell strings arranged in the column direction are connected to the bit lines extending in the column direction. In FIG. 4, the cell strings CS11 and CS21 of the first column are connected to the first bit line BL1. The cell strings CS1$m$ and CS2$m$ of the m-th column are connected to the m-th bit line BL$m$.

The memory cells connected to the same word line in the cell strings arranged in the row direction configure one page. For example, the memory cells connected to the first word line WL1, among the cell strings CS11 to CS1$m$ of the first row configure one page. The memory cells connected to the first word line WL1, among the cell strings CS21 to CS2$m$ of the second row configure another page. The cell strings arranged in one row direction may be selected by selecting any of the drain select lines DSL1 and DSL2. One page of the selected cell strings may be selected by selecting any of the word lines WL1 to WLn.

In another embodiment, even bit lines and odd bit lines may be provided instead of the first to m-th bit lines BL1 to BL$m$. In addition, even-numbered cell strings among the cell strings CS11 to CS1$m$ or CS21 to CS2$m$ arranged in the row direction may be connected to the even bit lines, and odd-numbered cell strings among the cell strings CS11 to CS1$m$ or CS21 to CS2$m$ arranged in the row direction may be connected to odd bit lines, respectively.

In an embodiment, at least one of the first to n-th memory cells MC1 to MCn may be used as a dummy memory cell. For example, at least one dummy memory cell is provided to reduce an electric field between the source select transistor SST and the memory cells MC1 to MCp. Alternatively, at least one dummy memory cell is provided to reduce an electric field between the drain select transistor DST and the memory cells MCp+1 to MCn. As more dummy memory cells are provided, reliability of an operation for the memory block BLKa is improved, however, the size of the memory block BLKa increases. As less memory cells are provided, the size of the memory block BLKa may be reduced, however, the reliability of the operation for the memory block BLKa may be reduced.

In order to efficiently control at least one dummy memory cell, each of the dummy memory cells may have a required threshold voltage. Before or after an erase operation for the memory block BLKa, program operations for all or a part of the dummy memory cells may be performed. When the erase operation is performed after the program operation is performed, the dummy memory cells may have the required threshold voltage by controlling a voltage applied to dummy word lines connected to the respective dummy memory cells.

Figure 5:
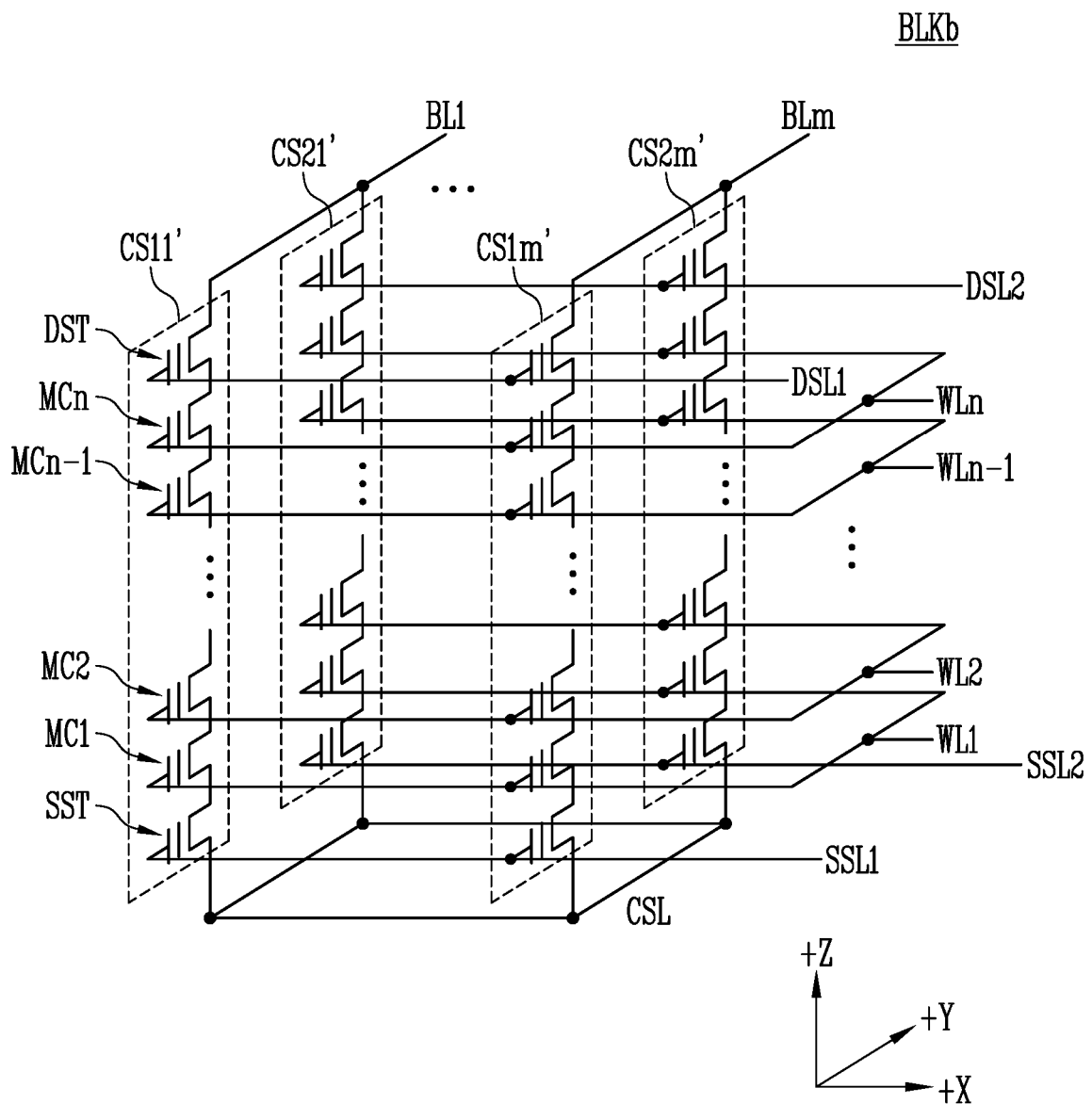
FIG. 5 is a circuit diagram illustrating a memory block BLKb of the memory blocks BLK1 to BLKz of FIG. 3 according to an embodiment of the present disclosure.

FIG. 5 is a circuit diagram illustrating a memory block BLKb of the memory blocks BLK1 to BLKz of FIG. 3 according to an embodiment of the present disclosure.

Referring to FIG. 5, the memory block BLKb includes a plurality of cell strings CS11' to CS1m' and CS21' to CS2m'. Each of the plurality of cell strings CS11' to CS1m' and CS21' to CS2m' extends along a +Z direction. Each of the plurality of cell strings CS11' to CS1m' and CS21' to CS2m' includes at least one source select transistor SST, first to n-th memory cells MC1 to MCn, and at least one drain select transistor DST stacked on a substrate (not shown) under the memory block BLK1'.

The source select transistor SST of each cell string is connected between a common source line CSL and memory cells MC1 to MCn. The source select transistors of the cell strings arranged in the same row are connected to the same source select line. The source select transistors of the cell strings CS11' to CS1m' arranged in a first row are connected to a first source select line SSL1. The source select transistors of the cell strings CS21' to CS2m' arranged in a second row are connected to a second source select line SSL2. In another embodiment, the source select transistors of the cell strings CS11' to CS1m' and CS21' to CS2m' may be commonly connected to one source select line.

The first to n-th memory cells MC1 to MCn of each cell string are connected in series between the source select transistor SST and the drain select transistor DST. Gates of the first to n-th memory cells MC1 to MCn are connected to first to the n-th word lines WL1 to WLn, respectively.

The drain select transistor DST of each cell string is connected between a corresponding bit line and the memory cells MC1 to MCn. The drain select transistors of the cell strings arranged in the row direction are connected to a drain select line extending in the row direction. The drain select transistors of the cell strings CS11' to CS1m' of a first row are connected to a first drain select line DSL1. The drain select transistors of the cell strings CS21' to CS2m' of a second row are connected to a second drain select line DSL2.

As a result, the memory block BLKb of FIG. 5 has an equivalent circuit similar to that of the memory block BLKa of FIG. 4 except that the pipe transistor PT is excluded from each cell string.

In another embodiment, even bit lines and odd bit lines may be provided instead of the first to m-th bit lines BL1 to BLm. In addition, even-numbered cell strings among the cell strings CS11' to CS1m' or CS21' to CS2m' arranged in the row direction may be connected to even bit lines, and odd-numbered cell strings among the cell strings CS11' to CS1m' or CS21' to CS2m' arranged in the row direction may be connected to odd bit lines, respectively.

In an embodiment, at least one of the first to n-th memory cells MC1 to MCn may be used as a dummy memory cell. For example, at least one dummy memory cell is provided to reduce an electric field between the source select transistor SST and the memory cells MC1 to MCn. Alternatively, at least one dummy memory cell is provided to reduce an electric field between the drain select transistor DST and the memory cells MC1 to MCn. As more dummy memory cells are provided, reliability of an operation for the memory block BLKb is improved, however, the size of the memory block BLKb increases. As less memory cells are provided, the size of the memory block BLKb may be reduced, however, the reliability of the operation for the memory block BLKb may be reduced.

In order to efficiently control at least one dummy memory cell, each of the dummy memory cells may have a required threshold voltage. Before or after an erase operation for the memory block BLKb, program operations for all or a part of the dummy memory cells may be performed. When the erase operation is performed after the program operation is performed, the dummy memory cells may have the required threshold voltage by controlling a voltage applied to the dummy word lines connected to the respective dummy memory cells.

Figure 6:
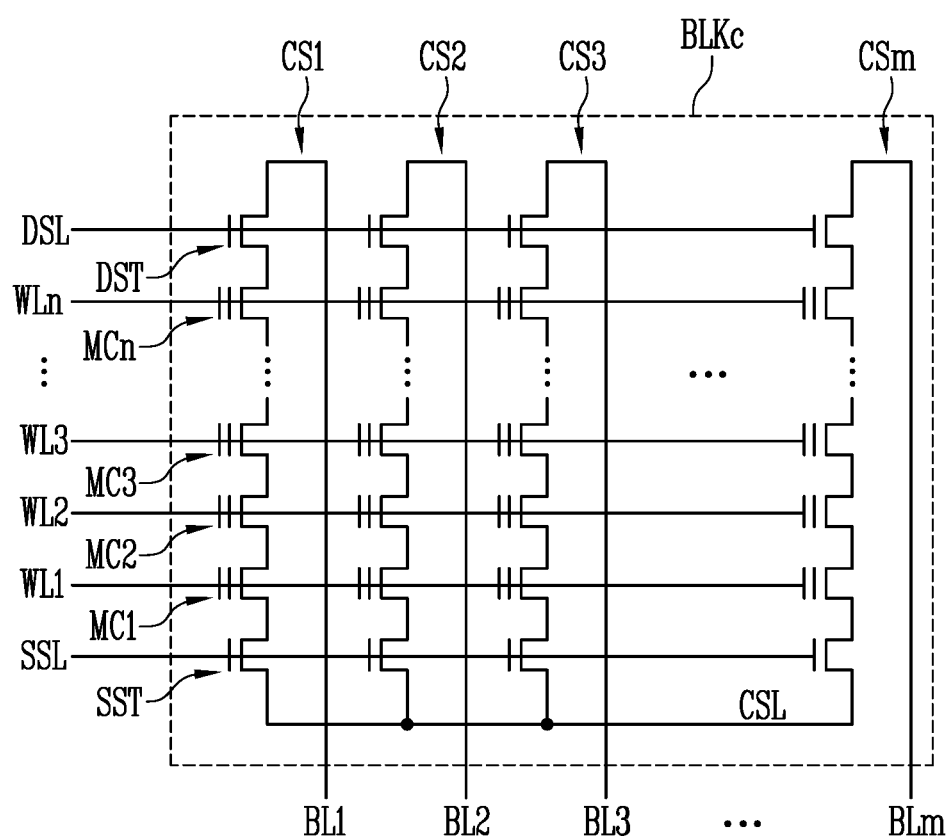
FIG. 6 is a circuit diagram illustrating a memory block BLKc of the memory blocks BLK1 to BLKz included in a memory cell array 110 of FIG. 2 according to an embodiment of the present disclosure.

FIG. 6 is a circuit diagram illustrating a memory block BLKc of the memory blocks BLK1 to BLKz included in the memory cell array 110 of FIG. 2 according to an embodiment of the present disclosure.

Referring to FIG. 6, the memory block BLKc includes a plurality of cell strings CS1 to CSm. The plurality of cell strings CS1 to CSm may be connected to a plurality of bit lines BL1 to BLm, respectively. Each of the cell strings CS1 to CSm includes at least one source select transistor SST, first to n-th memory cells MC1 to MCn, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating film, a charge storage film, and a blocking insulating film. In an embodiment, a pillar for providing the channel layer may be provided in each cell string. In an embodiment, a pillar for providing at least one of the channel layer, the tunneling insulating film, the charge storage film, and the blocking insulating film may be provided in each cell string.

The source select transistor SST of each cell string is connected between a common source line CSL and the memory cells MC1 to MCn.

The first to n-th memory cells MC1 to MCn of each cell string are connected between the source select transistor SST and the drain select transistor DST.

The drain select transistor DST of each cell string is connected between a corresponding bit line and the memory cells MC1 to MCn.

Memory cells connected to the same word line configure one page. The cell strings CS1 to CSm may be selected by selecting the drain select line DSL. One page among the selected cell strings may be selected by selecting any of the word lines WL1 to WLn.

In another embodiment, even bit lines and odd bit lines may be provided instead of the first to m-th bit lines BL1 to BLm. Even-numbered cell strings among the cell strings CS1 to CSm may be connected to even bit lines, and odd-numbered cell strings may be connected to odd bit lines, respectively.

Figure 7:
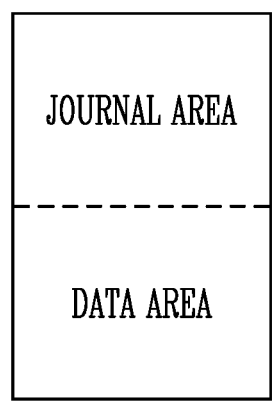
FIG. 7 is a diagram illustrating a journal area and a data area included in the memory cell array of FIG. 2 according to an embodiment of the present disclosure.

FIG. 7 is a diagram illustrating a journal area and a data area included in the memory cell array 110 of FIG. 2 according to an embodiment of the present disclosure.

Referring to FIG. 7, the memory cell array 110 of the semiconductor memory device 100 shown in FIG. 2 may be divided into the journal area and the data area. In an embodiment, a file system of the host 300 may divide a data storage area of the memory system 1000 into the journal area and the data area.

In some embodiments, the host 300 may drive the memory system 1000 based on a journaling technique. In the journaling technique or a journaling file system, after an area referred to as a journal is reserved, when a specific write operation occurs, data or meta data is firstly stored in the journal area without immediately being stored in a logical block address position in the memory system 1000. All data and meta data related to one write operation are stored in the journal area, and a stream of the data and the meta data is grouped into a unit called a transaction. In such a method, after several transactions are written to the journal area, a specific transaction perfectly written to the journal area through a background operation is written to a position (that is, a final position of the data area) of the storage device (i.e., the memory system 1000), at which the specific transaction is to be stored. When all are stored in the data area, the transaction is deleted from the journal area for a space of the journal area required for a next write operation.

In a case of using the journaling technique as described above, data consistency of the memory system 1000 may be maintained even though power supplied to the memory system 1000 is suddenly cut off, that is, when a sudden power-off (SPO) occurs. For example, when a write operation is stopped due to the SPO during the write operation, a result may remain in each of the data area and the journal area. An operation that is stopped while being written to the data area may be an operation that exists in a form of a transaction that is perfectly written to the journal area according to the file system of the host 300. When the power is supplied to the memory system 1000 again, the controller 200 may scan the journal area to complete the stopped write operation in a short time. Moreover, an operation that is stopped while being stored in the journal area may exist. In this case, an incomplete transaction may be stored in the journal area and then left in a stopped form. When power is supplied to the memory system 1000 again, such a transaction is ignored, thereby bringing consistency to the file system. In other words, consistency may be maintained by taking a method of ignoring the transaction so that recovery or consistency is not damaged with respect to all cases that may appear during a power failure.

FIG. 8 is a flowchart illustrating a method of operating a host according to an embodiment of the present disclosure.

Referring to FIG. 8, the method of operating the host 300 includes determining update of data stored in the memory system 1000 (S110), transferring a write command for writing meta journal data and journal data for data update to a journal area of the memory system 1000 to the memory system (S130), transferring a flush command to the memory system (S140), transferring a write command for writing commit data to the journal area to the memory system, in response to a write completion of the journal data (S150), transferring a flush command to the memory system (S160), transferring a write command for writing write data corresponding to the journal data to the data area to the memory system in response to a write completion of the commit data (S170).

According to the embodiment shown in FIG. 8, the journal data and the meta journal data corresponding thereto are written in the journal area by operation S130 and operation S140. That is, as operation S140 of transferring the flush command to the memory system is performed, the memory system may start to actually write the meta journal data and the journal data to the journal area. After the operation of writing the meta journal data and the journal data to the journal area is completed, the commit data is written to the journal area by operation S150 and operation S160. That is, as operation S160 of transferring the flush command to the memory system is performed, the memory system may start to actually write the commit data to the journal area. The write data is written to the data area after an operation of writing the commit data to the journal area is completed. The write data may be data that is substantially the same as the journal data.

Therefore, when the SPO occurs, in a process of writing the write data to the data area, the write operation may be recovered in a method of writing the journal data, which is written to the journal area, to the data area as the write data, by checking the commit data, which is written to the journal area, when the memory system is recovered from the SPO.

When the SPO occurs before the operation of writing the commit data to the journal area is completed, the commit data that is incompletely written to the journal area may be checked, or it may be checked that the commit data is not written to the journal area, when the memory system is recovered from the SPO. In this case, the journal data written to the journal area may be ignored, and the corresponding transaction may be performed again under control of the host 300.

Figure 9A:
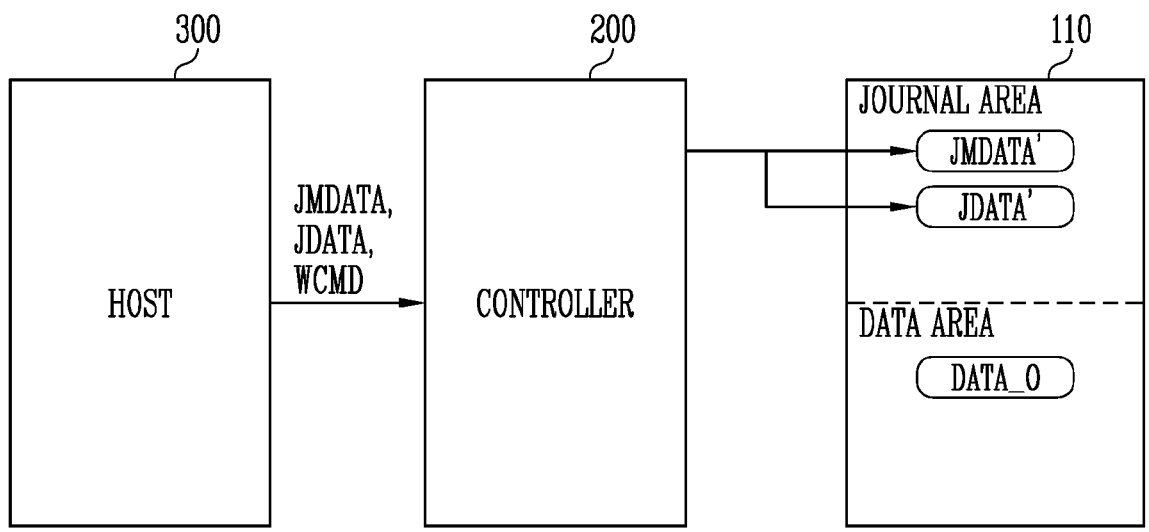
FIGS. 9A, 9B, and 9C are diagrams illustrating the method of operating the host shown in FIG. 8 according to an embodiment of the present disclosure.
Figure 9B:
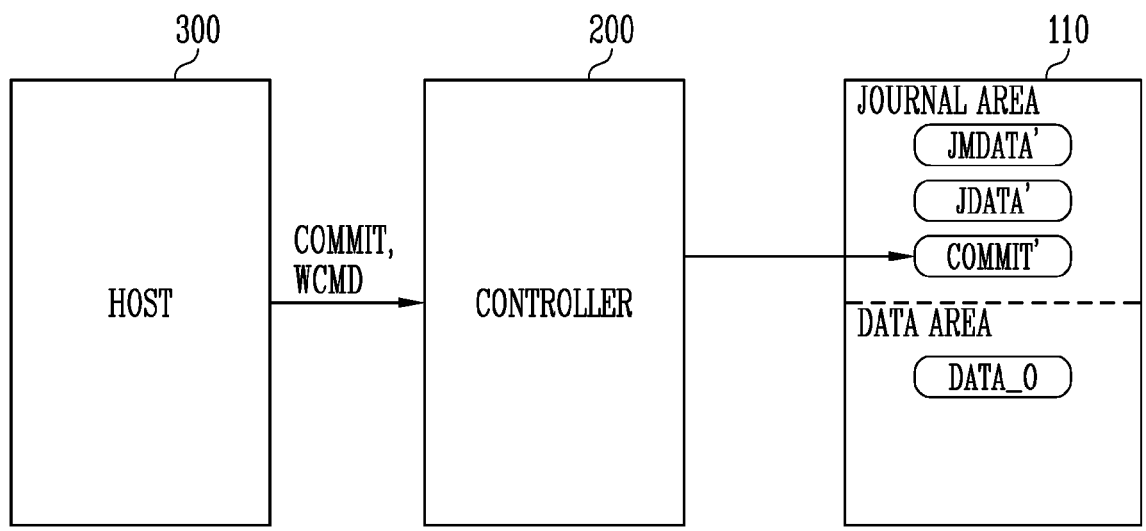
Figure 9C:
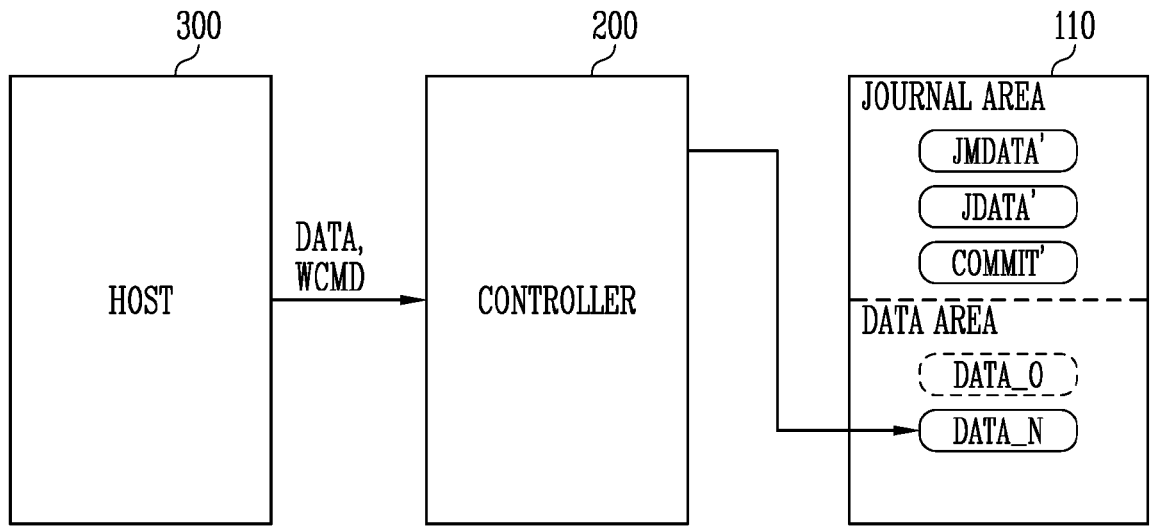

FIGS. 9A, 9B, and 9C are diagrams illustrating the method of operating the host shown in FIG. 8 according to an embodiment of the present disclosure.

Referring to FIG. 9A, old data DATA_O is stored in the data area of the memory cell array 110. As shown in FIG. 8, the host 300 may determine update of the old data DATA_O stored in the memory cell array 110 in the memory system 1000 (S110).

According to the determination of operation S110, the host 300 transfers meta journal data JMDATA, journal data JDATA, and a write command WCMD to the controller 200 of the memory system 1000 (S130). Thereafter, although not shown in FIG. 9A, the host 300 may transfer a flush command to the controller 200 of the memory system 1000 (S140). The controller 200 may control the semiconductor memory device 100 to program meta journal data JMDATA' and journal data JDATA' generated based on the received meta journal data JMDATA and journal data JDATA in the journal area of the memory cell array 110, in response to the received write command WCMD and flush command. At this time, the controller 200 may program the meta journal data JMDATA' and the journal data JDATA', in which a parity is added to each of the meta journal data JMDATA and the journal data JDATA, in the journal area.

Although not shown in FIGS. 9A and 9B, when the meta journal data JMDATA' and the journal data JDATA' are completely written to the journal area, the controller 200 may transfer a completion message to the host 300. Referring to FIG. 9B, in response to the completion message, the host 300 transfers commit data COMMIT and the write command WCMD to the controller 200 of the memory system 1000 (S150). Thereafter, although not shown in FIG.

9B, the host 300 may transfer the flush command to the controller 200 of the memory system 1000 (S160). In response to the write command WCMD and the flush command, the controller 200 may control the semiconductor memory device 100 to program commit data COMMIT' generated based on the received commit data COMMIT in the journal area of the memory cell array 110. At this time, the controller 200 may program the commit data COMMIT', in which a parity is added to the commit data COMMIT, in the journal area.

Although not shown in FIG. 9C, when the commit data COMMIT' is completely written to the journal area, the controller 200 may transfer a completion message to the host 300. Referring to FIG. 9C, in response to the completion message, the host 300 may transfer write data DATA and the write command WCMD to the controller 200 of the memory system 1000 (S170). The write data DATA may be substantially the same data as the journal data JDATA. The controller 200 may control the semiconductor memory device 100 to program the write data DATA received from the host 300 as new data DATA_N in the data area. Here, the new data DATA_N stored in the data area may be substantially the same data as the journal data JDATA' stored in the journal area. As the new data DATA_N is stored in the data area, the old data DATA_O may be invalidated. Accordingly, the update operation of the data is completed.

Figure 10A:
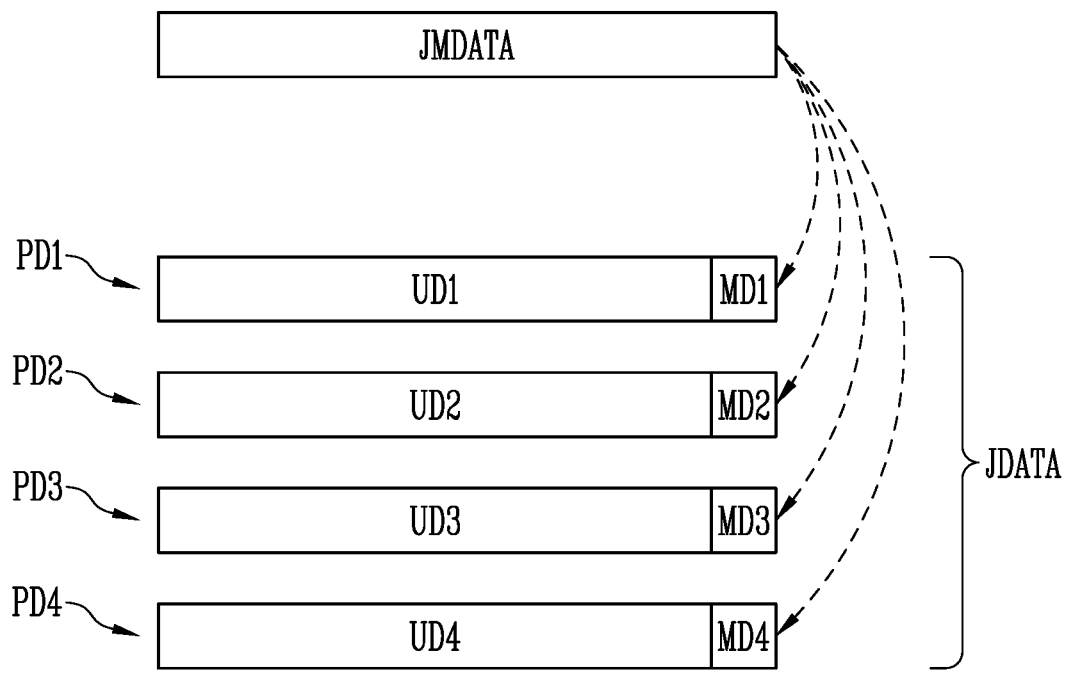

FIGS. 10A, 10B, and 10C are diagrams illustrating a structure of the data written to the journal area or the data area by the method shown in FIG. 8 according to an embodiment of the present disclosure.

Referring to FIG. 10A, the meta journal data JMDATA and the journal data JDATA are shown. More specifically, FIG. 10A shows an example in which the journal data JDATA included in one transaction includes a plurality of partial data PD1 to PD4. That is, the partial data PD1 to PD4 shown in FIG. 10A may be included in the journal data JDATA or the write data DATA shown in FIGS. 9A to 9C.

As shown in FIG. 10A, each of the partial data PD1 to PD4 may include corresponding user data UD1 to UD4 and meta data MD1 to MD4. The user data UD1 to UD4 may be data for updating the old data. The first partial data PD1 includes the first user data UD1 and the first meta data MD1, and the second partial data PD2 includes the second user data UD2 and the second meta data MD2. Meanwhile, the third partial data PD3 includes the third user data UD3 and the third meta data MD3, and the fourth partial data PD4 includes the fourth user data UD4 and the fourth meta data MD4.

As will be described later with reference to FIG. 10B, the controller 200 generates parity data PT1 to PT4 corresponding to the respective partial data PD1 to PD4, and controls the semiconductor memory device 100 to program page data PG1 to PG4 including the parity data PT1 to PT4 in the journal area of the memory cell array 110 as the journal data JDATA'.

As shown in FIG. 10A, the meta journal data JMDATA may include information on the first to fourth partial data PD1 to PD4. For example, the meta journal data JMDATA may include information that the journal data JDATA is divided into four partial data PD1 to PD4. In addition, the meta journal data JMDATA may include a descriptor identifier (ID) for distinguishing a transaction including the journal data.

Furthermore, the meta data MD1 to MD4 included in the first to fourth partial data PD1 to PD4, respectively, may also include a descriptor ID for distinguishing a transaction in which the meta data MD1 to MD4 are included. Accordingly, the meta journal data JMDATA and the first to fourth meta data MD1 to MD4 may include the same descriptor ID.

Referring to FIG. 10B, the first parity data PT1 is generated by the first partial data PD1, and the second parity data PT2 is generated by the second partial data PD2. In addition, the third parity data PT3 is generated by the third partial data PD3, and the fourth parity data PT4 is generated by the fourth partial data PD4. That is, the first to fourth parity data PT1 to PT4 may be generated based on the corresponding partial data PD1 to PD4, respectively.

As an example, the parity data PT1 to PT4 may be generated by a cyclic redundancy check (CRC) method. However, this is an example, and the parity data PT1 to PT4 may be generated by various other methods.

Referring to FIG. 10C, the journal data JDATA' including the parity data described by FIG. 10B is shown. That is, the first page data PG1 may be generated by adding the first parity data PT1 to the first partial data PD1 including the first user data UD1 and the first meta data MD1, and the second page data PG2 may be generated by adding the second parity data PT2 to the second partial data PD2 including the second user data UD2 and the second meta data MD2. In addition, the third page data PG3 may be generated by adding the third parity data PT3 to the third partial data PD3 including the third user data UD3 and the third meta data MD3, and the fourth page data PG4 may be generated by adding the fourth parity data PT4 to the fourth partial data PD4 including the fourth user data UD4 and the fourth meta data MD4. The first to fourth page data PG1 to PG4 may configure the journal data JDATA'.

Moreover, parity data PTM may be generated based on the meta journal data JMDATA. The meta journal data JMDATA' may be generated by adding the parity data PTM to meta journal data JMDATA.

Figure 11:
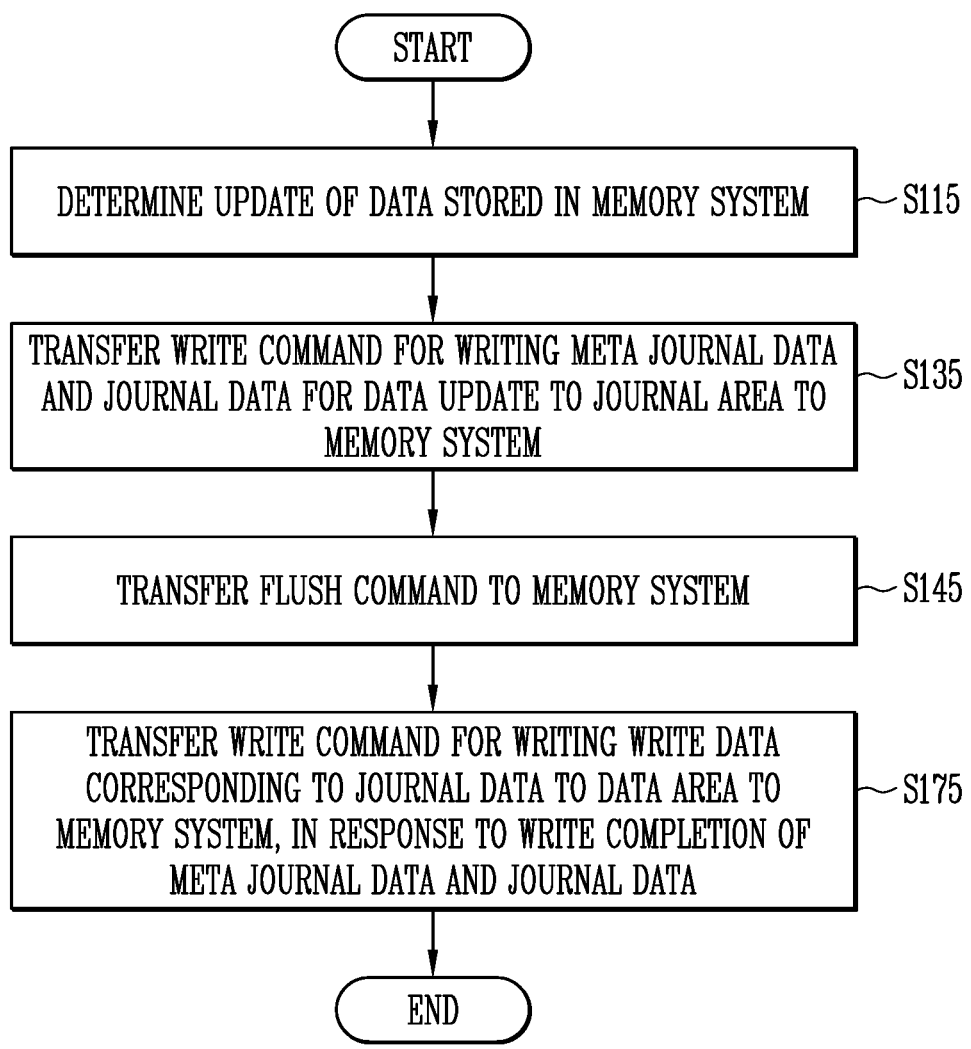
FIG. 11 is a flowchart illustrating a method of operating a host according to another embodiment of the present disclosure.

FIG. 11 is a flowchart illustrating a method of operating a host 300 according to another embodiment of the present disclosure.

Referring to FIG. 11, the method of operating the host 300 includes determining update of data stored in the memory system 1000 (S115), transferring a write command for writing meta journal data and journal data for data update to a journal area of the memory system 1000 to the memory system (S135), transferring a flush command to the memory system (S145), and transferring a write command for writing write data corresponding to the journal data to the data area to the memory system, in response to a write completion of the meta journal data and the journal data (S175).

According to the embodiment shown in FIG. 11, differently from the embodiment shown in FIG. 8, operation S150 of transferring the commit data to the memory system 1000 is not performed. However, in order to replace a role of the commit data for determining whether the transaction may be completed, a method of generating the parity data may be performed in a method different from that shown in FIG. 10B, when writing the journal data to the journal area (S135). A detailed method of generating the parity data in operation S135 is described later with reference to FIGS. 13A, 13B, and 13C.

Figure 12A:
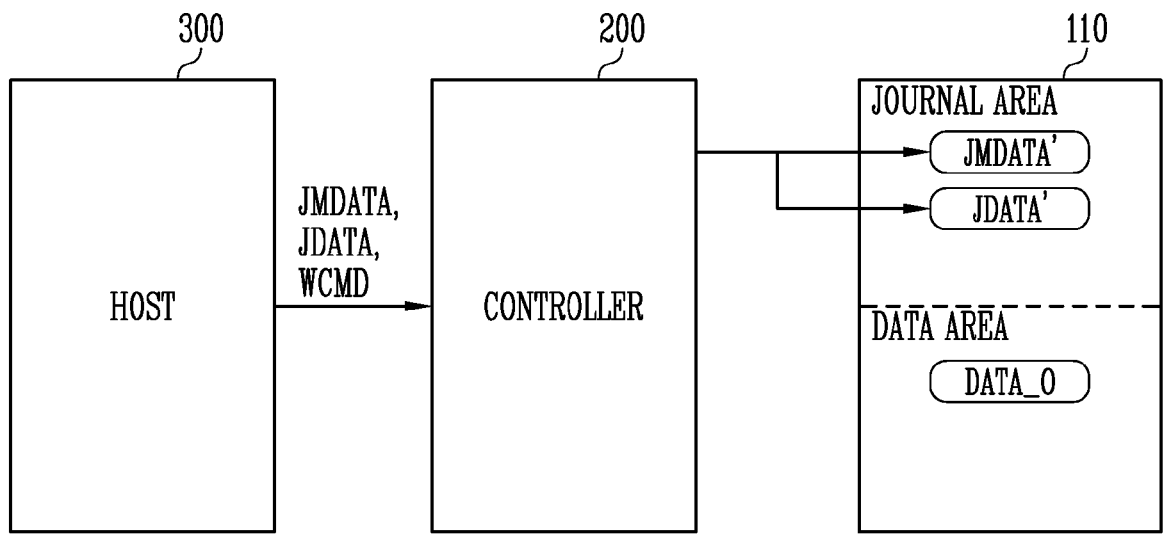
FIGS. 12A and 12B are diagrams illustrating the method of operating the host shown in FIG. 11 according to an embodiment of the present disclosure.
Figure 12B:
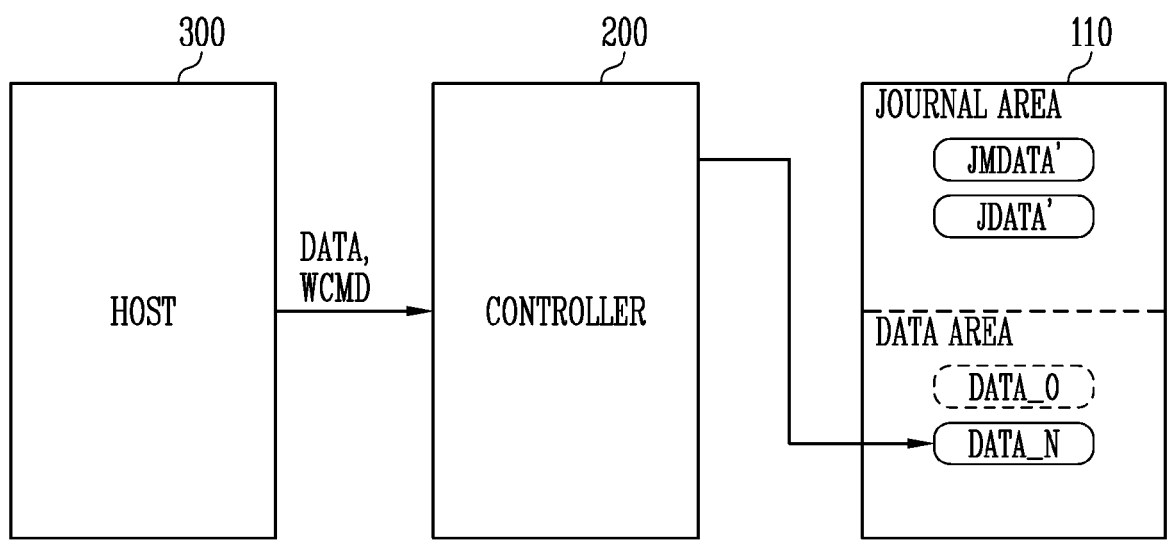

FIGS. 12A and 12B are diagrams illustrating the method of operating the host 300 shown in FIG. 11 according to an embodiment of the present disclosure.

Referring to FIG. 12A, old data DATA_O is stored in the data area of the memory cell array 110. As shown in FIG. 11, the host 300 may determine update of the old data DATA_O stored in the memory cell array 110 in the memory system 1000 (S115).

According to the determination of operation S115, the host 300 transfers meta journal data JMDATA, journal data JDATA, and a write command WCMD to the controller 200 of the memory system 1000 (S135). Thereafter, although not shown in FIG. 12A, the host 300 may transfer a flush command to the controller 200 of the memory system 1000 (S145). The controller 200 may control the semiconductor memory device 100 to program meta journal data JMDATA' and journal data JDATA' generated based on the received meta journal data JMDATA and journal data JDATA in the journal area of the memory cell array 110, in response to the received write command WCMD and flush command.

Although not shown in FIGS. 12A and 12B, when the meta journal data JMDATA' and the journal data JDATA' are completely written to the journal area, the controller 200 may transfer a completion message to the host 300. Referring to FIG. 12B, in response to the completion message, the host 300 may transfer write data DATA and the write command WCMD to the controller 200 of the memory system 1000 (S175). The write data DATA may be substantially the same data as the journal data JDATA. The controller 200 may control the semiconductor memory device 100 to program the write data DATA received from the host 300 as new data DATA_N in the data area. Here, the data programmed in the data area may be substantially the same data as the journal data JDATA' stored in the journal area. As the new data DATA_N is stored in the data area, the old data DATA_O may be invalidated. Accordingly, the update operation of the data is completed.

When comparing FIGS. 12A and 12B with FIGS. 9A to 9C, the operation for writing the commit data shown in FIG. 9B may not be performed in the method shown in FIGS. 12A and 12B. Accordingly, a write speed of the memory system may be improved.

Figure 13A:
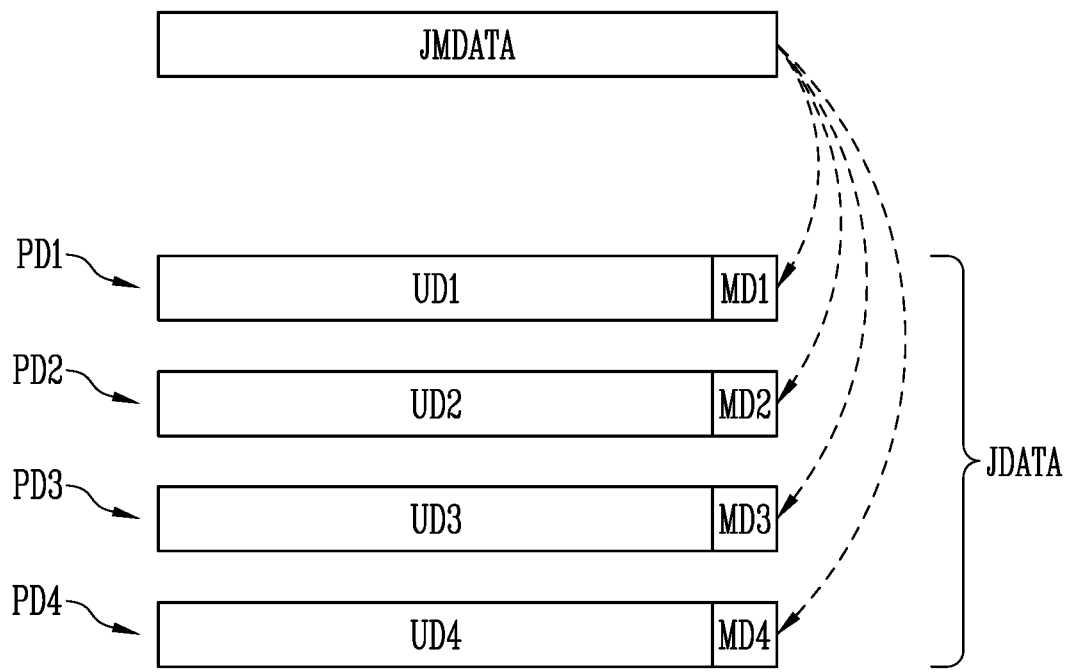
FIGS. 13A, 13B, and 13C are diagrams illustrating a structure of the data written to the journal area or the data area by the method shown in FIG. 11 according to an embodiment of the present disclosure.
Figure 13B:
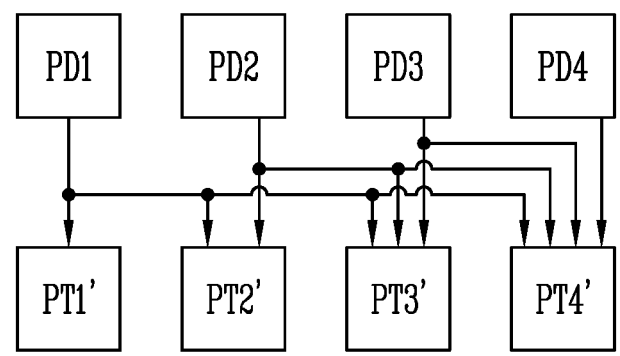
Figure 13C:
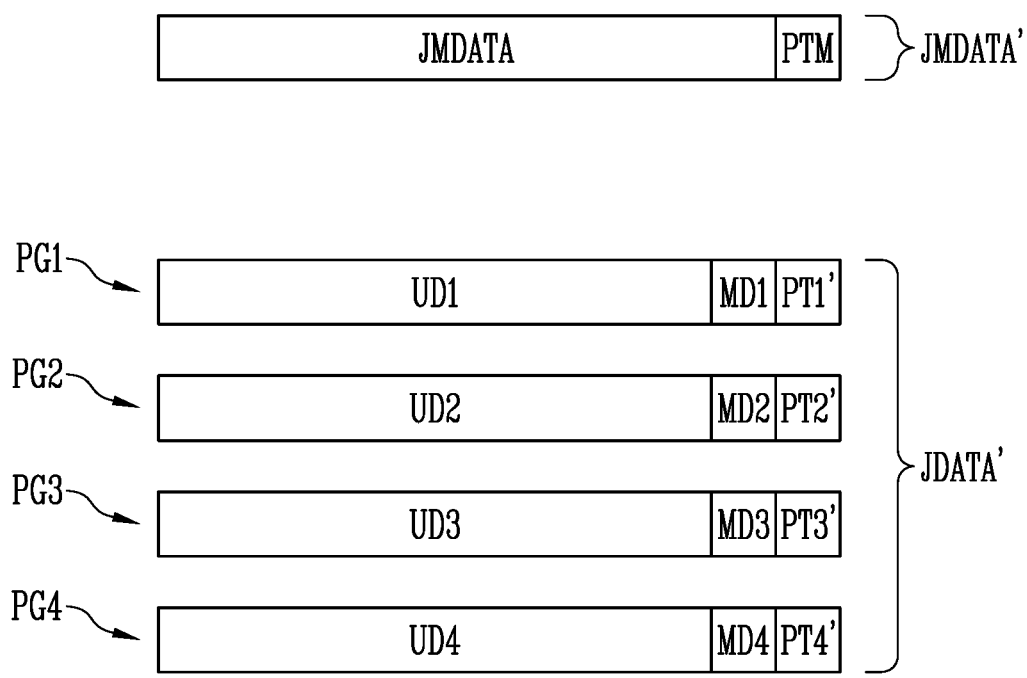

FIGS. 13A, 13B, and 13C are diagrams illustrating a structure of the data written to the journal area or the data area by the method shown in FIG. 11 according to an embodiment of the present disclosure.

Referring to FIG. 13A, the meta journal data JMDATA and the journal data JDATA are shown. More specifically, FIG. 13A shows an example in which data included in one transaction includes a plurality of page partial data PD1 to PD4. That is, the partial data PD1 to PD4 shown in FIG. 13A may be included in the journal data JDATA or the write data DATA shown in FIGS. 12A and 12B.

As shown in FIG. 13A, each of the partial data PD1 to PD4 may include corresponding user data UD1 to UD4 and meta data MD1 to MD4. The user data UD1 to UD4 may be data for updating the old data. The first partial data PD1 includes the first user data UD1 and the first meta data MD1, and the second partial data PD2 includes the second user data UD2 and the second meta data MD2. Furthermore, the third partial data PD3 includes the third user data UD3 and the third meta data MD3, and the fourth partial data PD4 includes the fourth user data UD4 and the fourth meta data MD4.

As will be described later with reference to FIG. 13B, the controller 200 generates parity data PT1 to PT4 corresponding to the respective partial data PD1 to PD4, and controls the semiconductor memory device 100 to program page data PG1 to PG4 including the parity data PT1 to PT4 in the journal area of the memory cell array 110 as the journal data JDATA'.

The meta data MD1 to MD4 included in the first to fourth partial data PD1 to PD4, respectively, may also include a descriptor ID for distinguishing a transaction in which the meta data MD1 to MD4 are included. Accordingly, the meta journal data JMDATA and the first to fourth meta data MD1 to MD4 may include the same descriptor ID.

Referring to FIG. 13B, the first parity data PT1' may be generated by the first partial data PD1. The second parity data PT2' may be generated by the first partial data PD1 and the second partial data PD2. In addition, the third parity data PT3' may be generated by the first to third partial data PD1 to PD3. Finally, the fourth parity data PT4' may be generated by the first to fourth partial data PD1 to PD4. That is, the parity data PT1' to PT4' included in the respective page data PG1 to PG4 are generated based on the corresponding partial data PD1 to PD4 and the previous partial data accumulatively.

Referring to FIG. 13C, the journal data JDATA' including the parity data described by FIG. 13B is shown. That is, the first page data PG1 may be generated by adding the first parity data PT1' to the first partial data PD1 including the first user data UD1 and the first meta data MD1, and the second page data PG2 may be generated by adding the second parity data PT2' to the second partial data PD2 including the second user data UD2 and the second meta data MD2. In addition, the third page data PG3 may be generated by adding the third parity data PT3' to the third partial data PD3 including the third user data UD3 and the third meta data MD3, and the fourth page data PG4 may be generated by adding the fourth parity data PT4' to the fourth partial data PD4 including the fourth user data UD4 and the fourth meta data MD4. The first to fourth page data PG1 to PG4 may configure the journal data JDATA'.

Referring to FIGS. 10B and 13B together, the parity data PT1 to PT4 generated according to FIG. 10B are generated based only on the corresponding partial data PD1 to PD4. However, the parity data PT1' to PT4' generated according to FIG. 13B are generated based on the corresponding partial data PD1 to PD4 and the previous partial data accumulatively. Accordingly, when the controller 200 reads any of the page data PG1 to PG4, a parity check operation is performed by referring to all previous page data. For example, when the controller 200 receives the first page data PG1, the controller 200 may perform the parity check operation based on the first partial data PD1 and the first parity data PT1'. However, when the controller 200 receives the third page data PD3, the controller 200 may perform the parity check operation based on the first to third partial data PD1 to PD3 and the third parity data PT3'. When using this, it may be determined whether the transaction is completed without the commit data of the journal area. Hereinafter, a more detailed description is given with reference to FIGS. 14 to 17B.

Referring to FIG. 13B, an embodiment in which the parity data PT1' to PT4' are generated based on the corresponding partial data PD1 to PD4 and all previous partial data accumulatively is shown. However, the present disclosure is not limited thereto. In this example, the write data includes first to N-th partial data. An i-th parity data among first to N-th parity data corresponding the first to N-th partial data may be generated based on at least one of first to (i−1)-th partial data and i-th partial data. For example, when the write data includes first to fourth partial data, first parity data is generated based on the first partial data. Furthermore, second parity data is generated based on the first partial data and the second partial data. In addition, third parity data may be generated based on at least one of the first partial data and the second partial data and the third partial data. In addition, the fourth parity data may be generated based on at least one of the first to third partial data and the fourth partial data.

Figure 14:
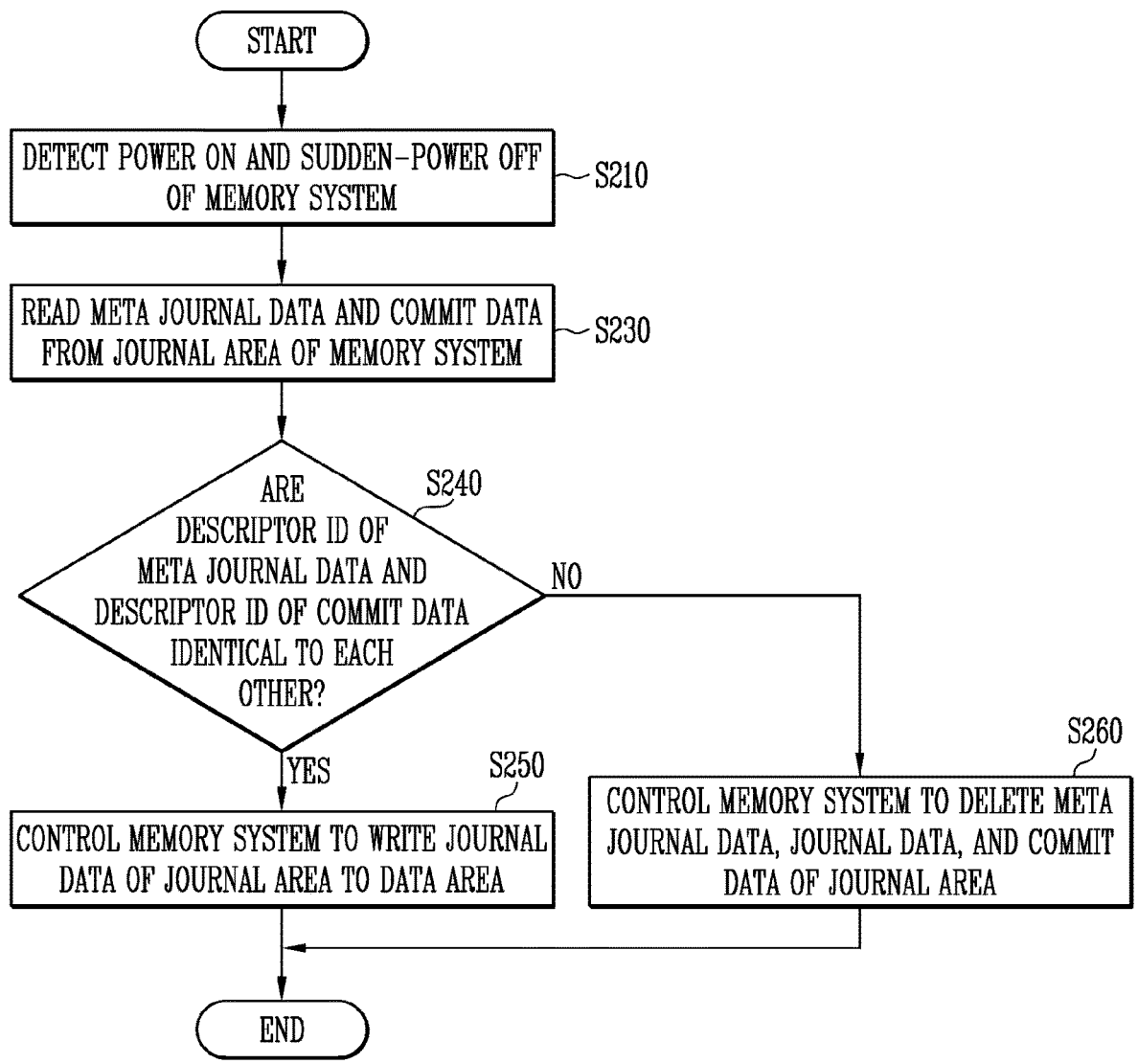
FIG. 14 is a flowchart illustrating a method of operating a host according to still another embodiment of the present disclosure.

FIG. 14 is a flowchart illustrating a method of operating a host according to still another embodiment of the present disclosure.

Referring to FIG. 14, the method of operating the host includes detecting power on and SPO of the memory system 1000 (S210), reading the meta journal data and the commit data from the journal area of the memory system 1000 (S230), determining whether the descriptor IDs of the meta journal data JMDATA and the commit data COMMIT are identical to each other (S240).

In an embodiment, the descriptor ID may be an identifier (ID) for identifying a transaction to which the meta journal data JMDATA and the commit data COMMIT belong. For example, the meta journal data JMDATA and the commit data COMMIT belonging to the same transaction may include the same descriptor ID. Accordingly, when the descriptor IDs of the meta journal data JMDATA and the commit data COMMIT are identical to each other, the meta journal data JMDATA, the journal data JDATA, and the commit data COMMIT may be included in the same transaction. Since the commit data COMMIT is written, it is guaranteed that the journal data JDATA belonging to the corresponding transaction is also completely stored in the journal area before the SPO occurs.

According to an embodiment, the method of operating the host 300 further includes writing the journal data JDATA of the journal area to the data area (S250) when the descriptor IDs of the meta journal data JMDATA and the commit data COMMIT are identical to each other (S240: Yes). Accordingly, the data update operation before the occurrence of the SPO may be recovered.

According to an embodiment, the method of operating the host 300 further includes deleting the meta journal data JMDATA, the journal data JDATA and the commit data COMMIT of the journal area (S260) when the descriptor IDs of the meta journal data JMDATA and the commit data COMMIT are not identical to each other (S240: No). Accordingly, the data update operation before the occurrence of the SPO may not be recovered, and the data update operation may be restarted from the beginning.

In operation S240, a case where the descriptor IDs of the meta journal data JMDATA and the commit data COMMIT are identical to each other means that the journal data JDATA stored in the journal area is written immediately before the SPO, and integrity of the journal data JDATA is guaranteed. Therefore, in this case, the journal data JDATA of the journal area may be used to complete the transaction. Accordingly, the operation proceeds to operation S250 and the journal data JDATA of the journal area is written to the data area. Hereinafter, operation S250 is described with reference to FIGS. 15A and 15B.

Figure 15A:
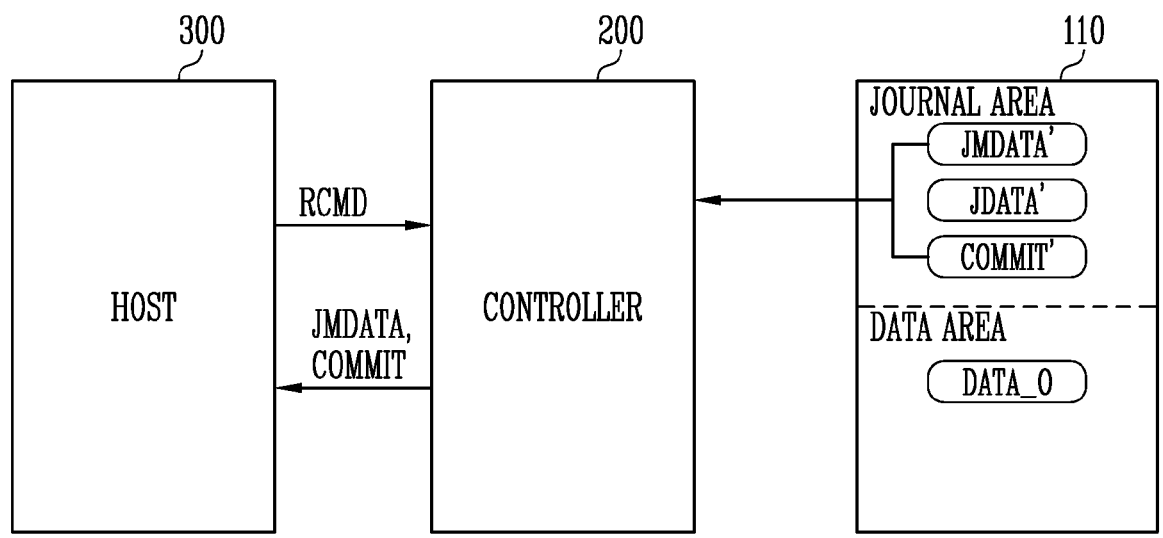
FIGS. 15A and 15B are diagrams illustrating a method of writing data of the journal area to the data area after a sudden power-off (SPO) occurs as shown in FIG. 14 according to an embodiment of the present disclosure.
Figure 15B:
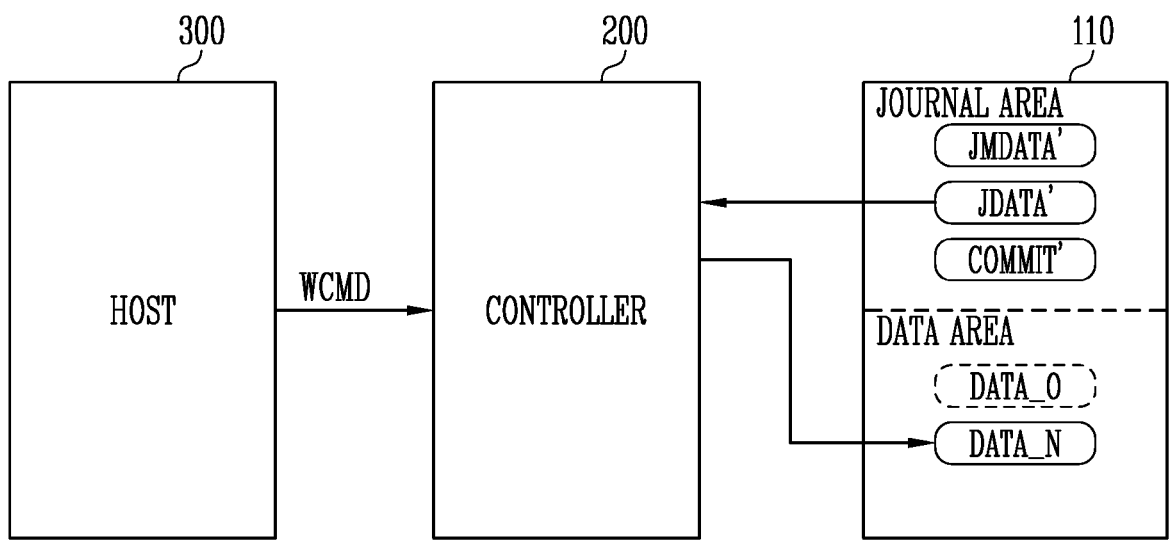

FIGS. 15A and 15B are diagrams illustrating a method of writing data of the journal area to the data area after the SPO occurs as shown in FIG. 14 according to an embodiment of the present disclosure. Referring to FIG. 15A, the host 300 detects the power on of the memory system 1000 and the occurrence of SPO (S210), and controls the memory system 1000 to read the commit data COMMIT' and the meta journal data JMDATA' written in the journal area, in response to the power on of the memory system 1000 and the occurrence of SPO (S230). More specifically, the host 300 transfers a read command RCMD for reading the meta journal data JMDATA' and the commit data COMMIT' to the controller 200. The controller 200 controls the semiconductor memory device 100 to read the commit data COMMIT' and the meta journal data JMDATA' stored in the journal area, in response to the received read command RCMD. The read meta journal data JMDATA and commit data COMMIT are transferred to the host 300.

The host 300 compares received journal data with commit data based on the read operation of the memory system 1000. The meta journal data JMDATA and the commit data COMMIT may include a descriptor ID that may distinguish a transaction in which corresponding data is included. The host 300 compares the descriptor ID of the meta journal data JMDATA and the descriptor ID of the commit data COMMIT. When the descriptor IDs of the meta journal data JMDATA and the commit data COMMIT are identical to each other, the journal data JDATA written to the journal area by the transaction immediately before the SPO is complete. Therefore, in this case, the host 300 may read the journal data JDATA' stored in the journal area as shown in FIG. 15B and control the memory system 1000 to store the journal data JDATA' in the data area as the new data DATA_N (S250). To this end, the host 300 may transfer the write command WCMD for controlling the memory system 1000 to store the journal data JDATA' in the data area as the new data DATA_N to the memory system 1000.

Although not shown in FIGS. 15A and 15B, when the descriptor IDs of the meta journal data JMDATA and the commit data COMMIT are not identical to each other (S240: No), the host 300 may control the memory system 1000 to delete the meta journal data JMDATA', the journal data JDATA', and the commit data COMMIT' written in the journal area (S260). Optionally, in operation S260, instead of deleting the meta journal data JMDATA', the journal data JDATA', and the commit data COMMIT' written in the journal area, the meta journal data JMDATA', the journal data JDATA', and the commit data COMMIT' may be invalidated.

That is, the recovery method shown in FIGS. 14 to 15B corresponds to the journaling technique described with reference to FIGS. 8 to 10C. Hereinafter, the recovery method corresponding to the journaling technique described with reference to FIGS. 11 to 13C is described.

Figure 16A:
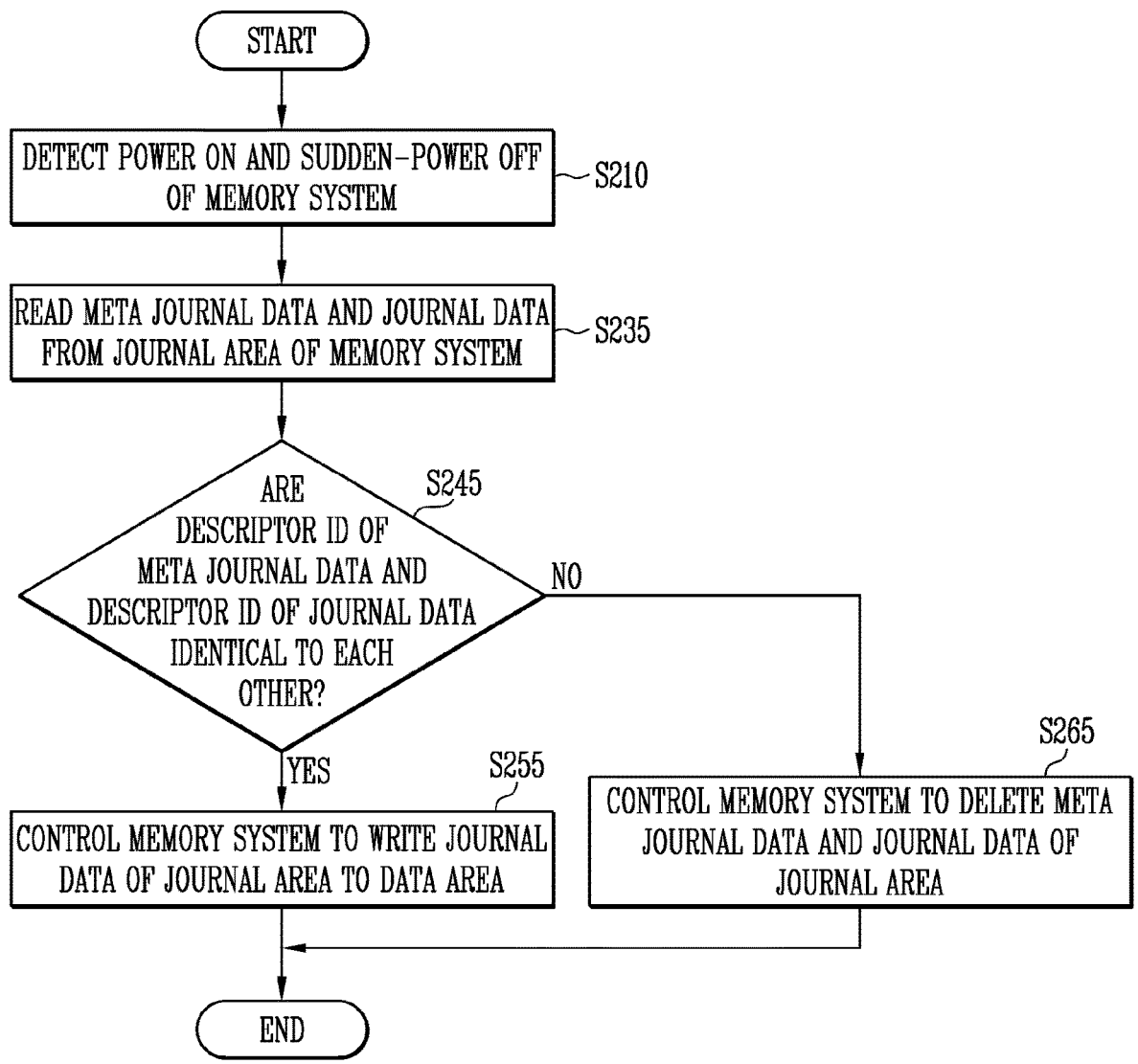
FIGS. 16A and 16B are flowcharts illustrating a method of operating a host according to still another embodiment of the present disclosure.
Figure 16B:
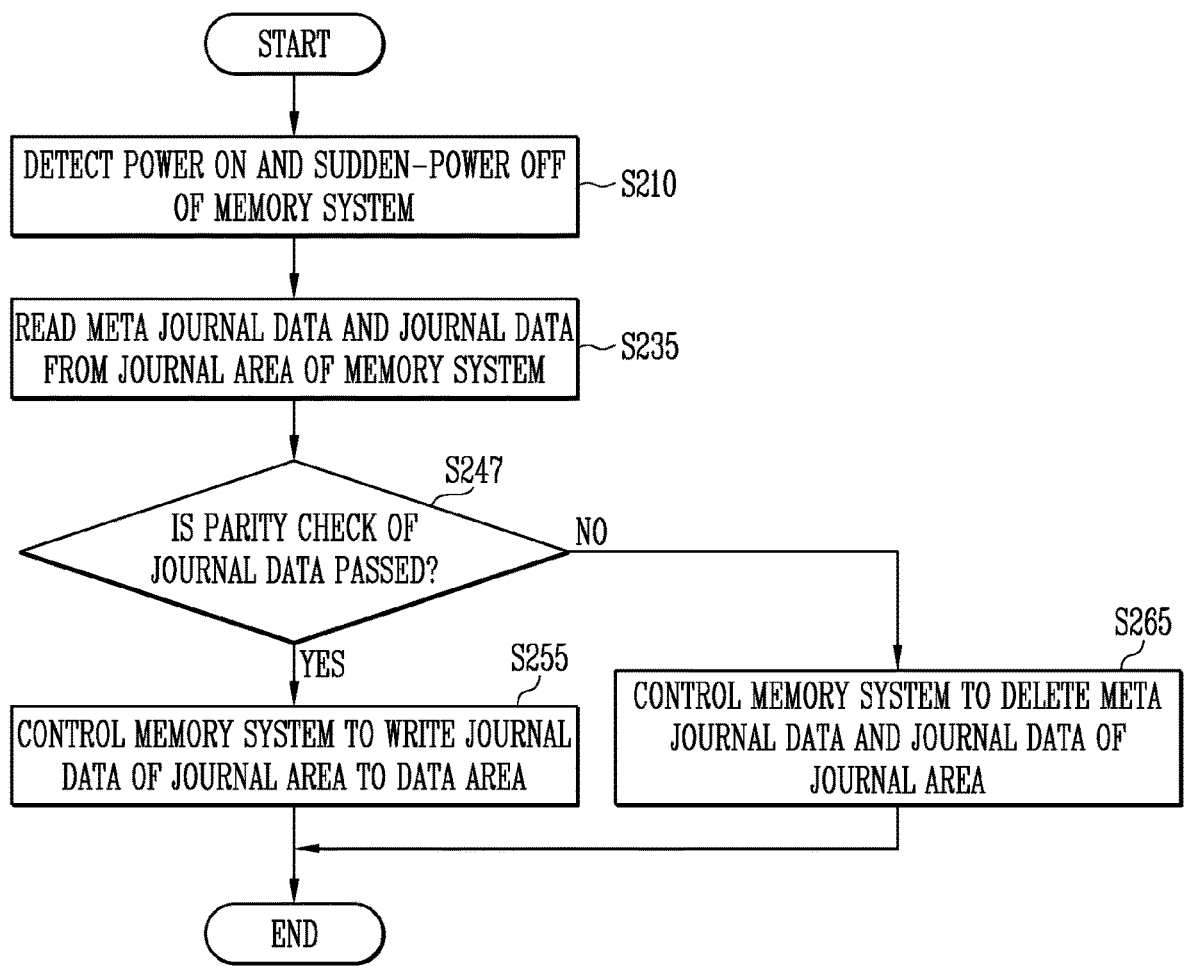

FIGS. 16A and 16B are flowcharts illustrating a method of operating a host according to still another embodiment of the present disclosure.

Referring to FIG. 16A, the method of operating the host includes detecting power on and SPO of the memory system 1000 (S210), reading the meta journal data JMDATA' and the journal data JDATA' from the journal area of the memory system 1000 (S235), and determining whether the descriptor IDs of the meta journal data JMDATA and the journal data JDATA are identical to each other (S245).

In an embodiment, the descriptor ID may be an ID for identifying the transaction to which the meta journal data JMDATA and the journal data JDATA belong. For example, the meta journal data JMDATA and the journal data JDATA belonging to the same transaction may include the same descriptor ID. For example, in the example of FIG. 13A, first to fourth meta data MD1 to MD4 may include the same data descriptor ID as the meta journal data JMDATA.

Accordingly, when the descriptor IDs of the meta journal data JMDATA and the journal data JDTATA are identical to each other, the meta journal data JMDATA and the journal data JDATA may be included in the same transaction.

The meta journal data JMDATA may include information on the number of partial data included in the journal data JDATA included in the corresponding transaction. In the example of FIG. 13A, the meta journal data JMDATA may include information that the journal data JDATA included in the corresponding transaction is configured of four partial data PD1' to PD4'. Accordingly, four page data PG1 to PG4 corresponding to the four partial data PD1' to PD4' as the journal data are read without an error, and when the descriptor ID included in the corresponding partial data PD1' to PD4' is the same as the descriptor ID of the meta journal data JMDATA, it is guaranteed that the journal data JDATA' belonging to the corresponding transaction is also completely stored in the journal area before the SPO occurs.

According to an embodiment, the method of operating the host 300 further includes writing the journal data JDATA of the journal area to the data area (S255) when the descriptor IDs of the meta journal data JMDATA and the journal data JDATA are identical to each other (S245: Yes). Accordingly, the data update operation before the occurrence of the SPO may be recovered.

According to an embodiment, the method of operating the host 300 further includes deleting the meta journal data JMDATA' and the journal data JDATA' of the journal area (S265) when the descriptor IDs of the meta journal data JMDATA and the journal data JDATA are not identical to each other (S245: No). Accordingly, the data update operation before the occurrence of the SPO may not be recovered, and the data update operation may be restarted from the beginning.

Referring to FIG. 16B, a method of operating a host according to still another embodiment of the present disclosure includes sensing power on and SPO of the memory system 1000 (S210), reading the meta journal data JMDATA' and the journal data JDATA' from the journal area of the memory system 1000 (S235), and determining whether the parity check of the journal data is passed (S247).

Operations S210 and S235 of FIG. 16B are substantially the same as operations S210 and S235 of FIG. 16A, and thus a repetitive description is omitted.

According to the embodiment of FIG. 16B, the method of operating the host 300 further includes writing the journal data JDATA' of the journal area to the data area (S255) when the parity check of the journal data is passed (S247: Yes). According to an embodiment, the method of operating the host 300 further includes deleting the meta journal data JMDATA' and the journal data JDATA' of the journal area (S265) when the parity check of journal data is not passed (S247: No).

In operation S247, a case where the parity check of the journal data JDATA' is passed means that the journal data JDATA' stored in the journal area is written immediately before the SPO, and the integrity of the journal data in the transaction is guaranteed. As described above with reference to FIG. 13B, in this case, the parity check may be performed by referring to the partial data corresponding to the parity data and other partial data included in the same transaction.

In an embodiment, in determining whether the parity check of the journal data has passed (S247), the host 300 may receive the journal data JDATA' stored in the journal area and directly perform the parity check operation on the corresponding journal data JDATA'.

In another embodiment, the controller 200 may receive the journal data JDATA' stored in the journal area and perform the parity check operation on the corresponding journal data JDATA'. The controller 200 may transmit whether or not the parity check operation has passed to the host 300, and thus the host 300 may determine whether the parity check of the journal data JDATA' has passed, based on a result of the parity check operation received from the controller 200.

More specifically, the journal data JDATA' read in operation S235 may include the first to fourth page data PG1 to PG4 shown in FIG. 13C. The parity check operation of the first page data PG1 may be performed based on the first partial data PD1 and the first parity data PT1'. The parity check operation of the second page data PG2 may be performed based on the first and second partial data PD1 to PD2 and the second parity data PT2'. The parity check operation of the third page data PG3 may be performed based on the first to third partial data PD1 to PD3 and the third parity data PT3'. The parity check operation of the fourth page data PG4 may be performed based on the first to fourth partial data PD1 to PD4 and the fourth parity data PT4'. When all of the parity check operations on the first to fourth page data PG1 to PG4 have passed, it may be determined that the parity check of the journal data has passed (S245: Yes). When the parity check operation on at least one of the first to fourth page data PG1 to PG4 has not passed, it may be determined that the parity check of the journal data has not passed (S245: No).

Figure 17A:
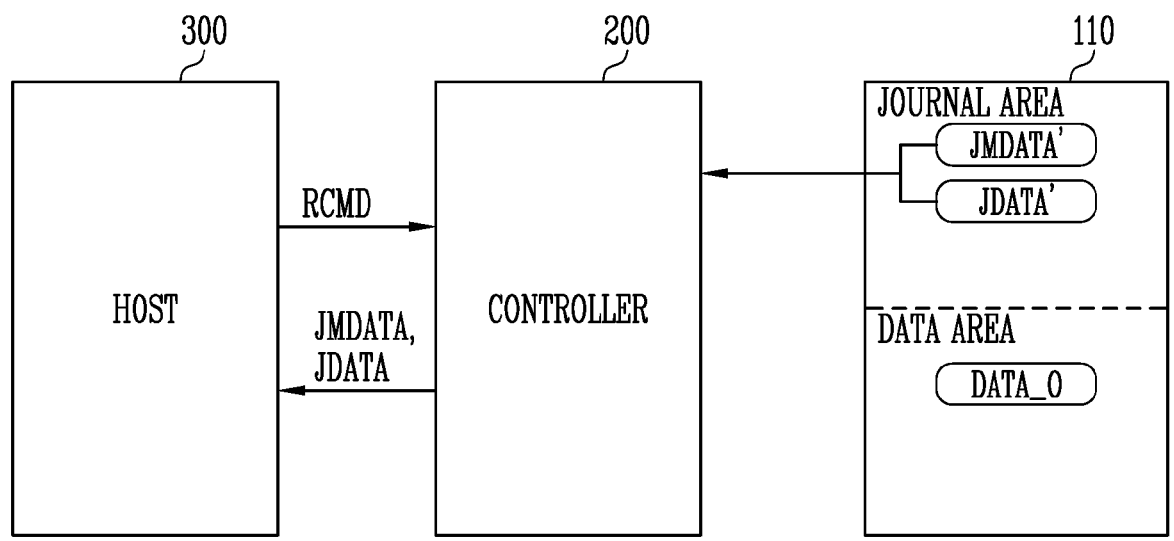
FIGS. 17A and 17B are diagrams illustrating a method of writing data of the journal area to the data area after the SPO occurs as shown in FIG. 16A according to an embodiment of the present disclosure.
Figure 17B:
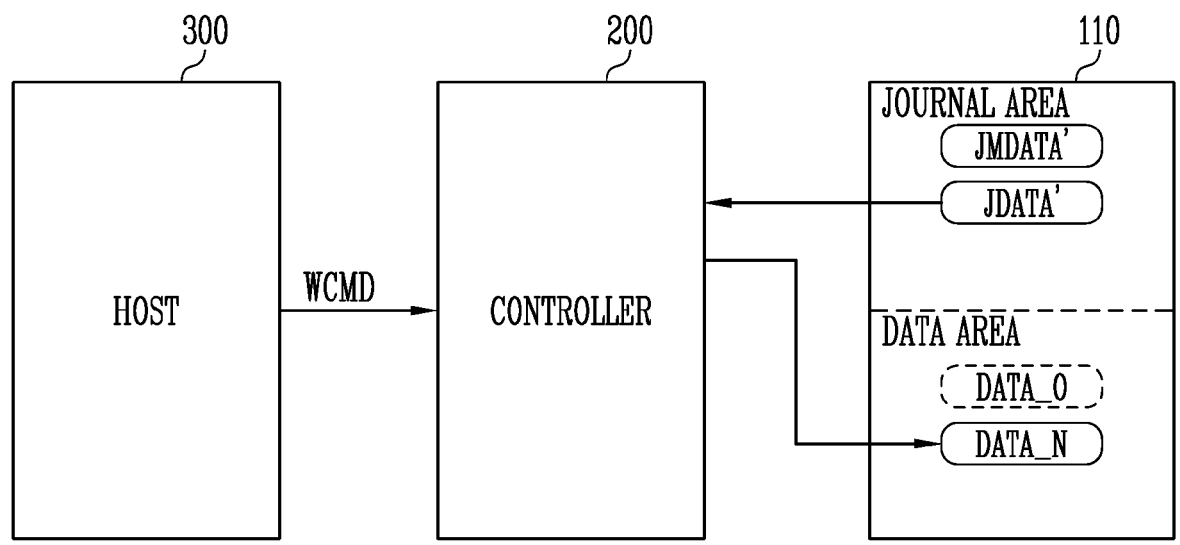

FIGS. 17A and 17B are diagrams illustrating a method of writing data of the journal area to the data area after the SPO occurs shown in FIG. 16A according to an embodiment of the present disclosure. Referring to FIG. 17A, the host 300 detects the occurrence of the SPO of the memory system 1000 (S210). The host 300 controls the memory system 1000 to read the meta journal data JMDATA' and the journal data JDATA' written to the journal area in response to the occurrence of the SPO (S235). More specifically, the host 300 transfers the read command RCMD for reading the meta journal data JMDATA' and the journal data JDATA' to the controller 200. The controller 200 controls the semiconductor memory device 100 to read the meta journal data JMDATA' and the journal data JDATA' stored in the journal area, in response to the received read command RCMD. The read meta journal data JMDATA and journal data JDATA are transferred to the host 300.

In an embodiment, as shown in FIG. 16A, the host 300 determines whether the descriptor IDs of the meta journal data JMDATA and the journal data JDATA received based on the read operation of the memory system 1000 are identical to each other (S245). When the descriptor IDs of the meta journal data JMDATA and the journal data JDATA are identical to each other (S245: Yes), the journal data JDATA' written to the journal area by a write transaction immediately before the SPO may be complete. Therefore, in this case, the host 300 may read the journal data JDATA' stored in the journal area as shown in FIG. 17B and control the memory system 1000 to store the journal data JDATA' in the data area as the new data DATA_N (S255). To this end, the host 300 may transfer the write command WCMD for controlling the memory system 1000 to store the journal data JDATA in the data area as the new data DATA_N to the memory system 1000.

Although not shown in FIGS. 17A and 17B, when the descriptor IDs of the meta journal data JMDATA and the journal data JDATA are not identical to each other (S245: No), the host 300 may control the memory system 1000 to delete the meta journal data JMDATA' and the journal data JDATA' written to the journal area (S265). Optionally, in operation S265, instead of deleting the meta journal data JMDATA' and the journal data JDATA' written to the journal area, the meta journal data JMDATA' and the journal data JDATA' may be invalidated.

In another embodiment, the host 300 performs the parity check operation of the journal data JDATA' received based on the read operation of the memory system 1000. When the parity check of the journal data JDATA' has passed (S247: Yes), the journal data written to the journal area by the write transaction immediately before the SPO is complete. Therefore, in this case, the host 300 may read the journal data JDATA' stored in the journal area as shown in FIG. 17B and control the memory system 1000 to store the journal data JDATA' in the data area as the new data DATA_N (S255). To this end, the host 300 may transfer the write command WCMD for controlling the memory system 1000 to store the journal data JDATA' in the data area as the new data DATA_N to the memory system 1000.

Although not shown in FIGS. 17A and 17B, when the parity check of the journal data JDATA' has not passed (S247: No), the host 300 may control the memory system 1000 to delete the meta journal data JMDATA' and the journal data JDATA' written to the journal area (S265). Optionally, in operation S265, instead of deleting the meta journal data JMDATA' and the journal data JDATA' written to the journal area, the meta journal data JMDATA' and the journal data JDATA' may be invalidated.

According to the method of operating the host 300 shown in FIG. 14, in order to recover a previous write transaction when detecting the SPO, the host 300 refers to the commit data COMMIT' stored in the journal area. To this end, the method of operating the host 300 shown in FIG. 8 requires the operation of writing the commit data COMMIT' to the journal area in response to the completion of writing the journal data JDATA'. Accordingly, a separate operation of writing the commit data COMMIT' is required after the meta journal data JMDATA' and the journal data JDATA' are written. This requires a longer time to update the old data DATA_O stored in the memory system 1000 with the new data DATA_N.

On the other hand, according to the method of operating the host 300 shown in FIG. 16, only the meta journal data JMDATA' and the journal data JDATA are referred to recover the previous write transaction when detecting the SPO. To this end, the method of operating the host 300 shown in FIG. 11 does not require the operation of writing the commit data COMMIT' to the journal area in response to the completion of writing the journal data JDATA'. That is, since the separate operation of writing the commit data COMMIT' after the meta journal data JMDATA and the journal data JDATA are written is unnecessary, only a shorter time may be required to update the old data DATA_O stored in the memory system 1000 with the new data DATA_N. As a result, an operation speed of the memory system 1000 may be improved.

Figure 18:
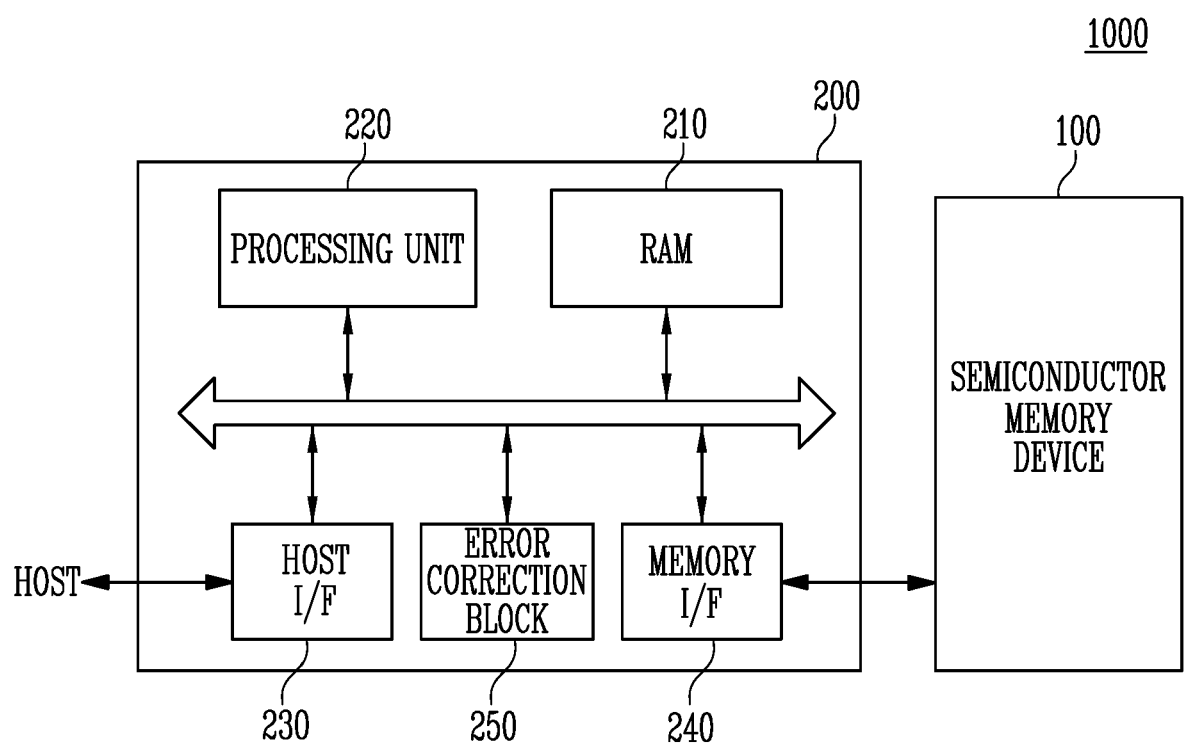
FIG. 18 is a block diagram illustrating an example of a controller shown in FIG. 1 according to an embodiment of the present disclosure.

FIG. 18 is a block diagram illustrating an example of the controller 200 shown in FIG. 1 according to an embodiment of the present disclosure.

Referring to FIG. 18, the controller 200 is connected to the semiconductor memory device 100 and a host HOST. The semiconductor memory device 100 may be the semiconductor memory device described with reference to FIG. 2.

The controller 200 is configured to access the semiconductor memory device 100 in response to a request from the host Host. For example, the controller 200 is configured to control read, write, erase, and background operations of the semiconductor memory device 100. The controller 200 is configured to provide an interface between the semiconductor memory device 100 and the host Host. The controller 200 is configured to drive firmware for controlling the semiconductor memory device 100.

The controller 200 includes a random access memory (RAM) 210, a processing unit 220, a host interface (I/F) 230, a memory interface 240, and an error correction block 250. The RAM 210 is used as at least one of an operation memory of the processing unit 220, a cache memory between the semiconductor memory device 100 and the host Host, and a buffer memory between the semiconductor memory device 100 and the host Host.

The processing unit 220 controls an overall operation of the controller 200.

The host interface 230 includes a protocol for performing data exchange between the host Host and the controller 200. In an embodiment, the controller 200 is configured to communicate with the host Host through at least one of various communication standards or interfaces such as a universal serial bus (USB) protocol, a multimedia card (MMC) protocol, a peripheral component interconnection (PCI) protocol, a PCI-express (PCI-e or PCIe) protocol, an advanced technology attachment (ATA) protocol, a serial ATA protocol, a parallel ATA protocol, a small computer system interface (SCSI) protocol, an enhanced small disk interface (ESDI) protocol, an integrated drive electronics (IDE) protocol, and a private protocol.

The memory interface 240 interfaces with the semiconductor memory device 100. For example, the memory interface 1240 includes a NAND interface or a NOR interface.

The error correction block 250 is configured to detect and correct an error of data received from the semiconductor memory device 100 using an error correcting code (ECC). The processing unit 220 may control the semiconductor memory device 100 to adjust a read voltage and perform re-read according to an error detection result of the error correction block 250. In an embodiment, the error correction block may be provided as a component of the controller 200.

The controller 200 and the semiconductor memory device 100 may be integrated into one semiconductor device. In an embodiment, the controller 200 and the semiconductor memory device 100 may be integrated into one semiconductor device to form a memory card. For example, the controller 200 and the semiconductor memory device 100 may be integrated into one semiconductor device to form a memory card such as a PC card (personal computer memory card international association (PCMCIA)), a compact flash card (CF), a smart media card (e.g., SM or SMC), a memory stick, a multimedia card (e.g., MMC, RS-MMC, or MMC-micro), a secure digital (SD) card (e.g., SD, miniSD, microSD, or SDHC), and a universal flash storage (UFS).

The controller 200 and the semiconductor memory device 100 may be integrated into one semiconductor device to form a semiconductor drive (solid state drive (SSD)). The semiconductor drive (SSD) includes the memory system 1000 configured to store data in a semiconductor memory. When the memory system 1000 including the controller 200 and the semiconductor memory device 100 is used as the semiconductor drive (SSD), an operation speed of the host connected to the memory system 1000 is dramatically improved.

As another example, the memory system 1000 including the controller 200 and the semiconductor memory device 100 is provided as one of various components of an electronic device such as a computer, an ultra-mobile PC (UMPC), a workstation, a net-book, a personal digital assistants (PDA), a portable computer, a web tablet, a wireless phone, a mobile phone, a smart phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, and a digital video player, a device capable of transmitting and receiving information in a wireless environment, one of various electronic devices configuring a home network, one of various electronic devices configuring a computer network, one of various electronic devices configuring a telematics network, an RFID device, or one of various components configuring a computing system.

In an embodiment, the semiconductor memory device 100 or the memory system including the same may be mounted as a package of various types. For example, the semiconductor memory device 100 or the memory system may be packaged and mounted in a method such as a package on package (PoP), ball grid arrays (BGAs), chip scale packages (CSPs), plastic leaded chip carriers (PLCC), a plastic dual in line package (PDIP), a die in waffle pack, die in wafer form, a chip on board (COB), a ceramic dual in line package (CERDIP), a plastic metric quad flat pack (MQFP), a thin quad flat pack (TQFP), a small outline integrated circuit (SOIC), a shrink small outline package (SSOP), a thin small outline package (TSOP), a system in package (SIP), a multi-chip package (MCP), a wafer-level fabricated package (WFP), or a wafer-level processed stack package (WSP).

Figure 19:
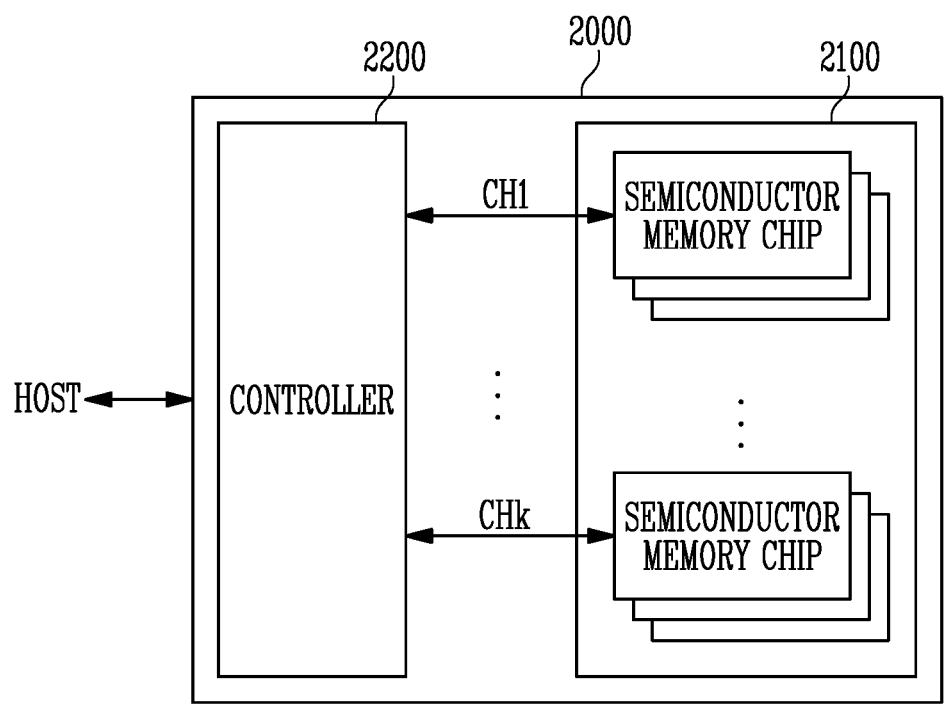
FIG. 19 is a block diagram illustrating an application example of the memory system of FIG. 1 according to an embodiment of the present disclosure.

FIG. 19 is a block diagram illustrating an application example of the memory system of FIG. 1 according to an embodiment of the present disclosure.

Referring to FIG. 19, the memory system 2000 includes a semiconductor memory device 2100 and a controller 2200. The semiconductor memory device 2100 includes a plurality of semiconductor memory chips. The plurality of semiconductor memory chips are divided into a plurality of groups.

In FIG. 19, the plurality of groups communicate with the controller 2200 through first to k-th channels CH1 to CHk, respectively. Each semiconductor memory chip is configured and is operated similarly to that of the semiconductor memory device 100 described with reference to FIG. 2.

Each group is configured to communicate with the controller 2200 through one common channel. The controller 2200 is configured similarly to the controller 200 described with reference to FIG. 18 and is configured to control the plurality of memory chips of the semiconductor memory device 2100 through the plurality of channels CH1 to CHk.

Figure 20:
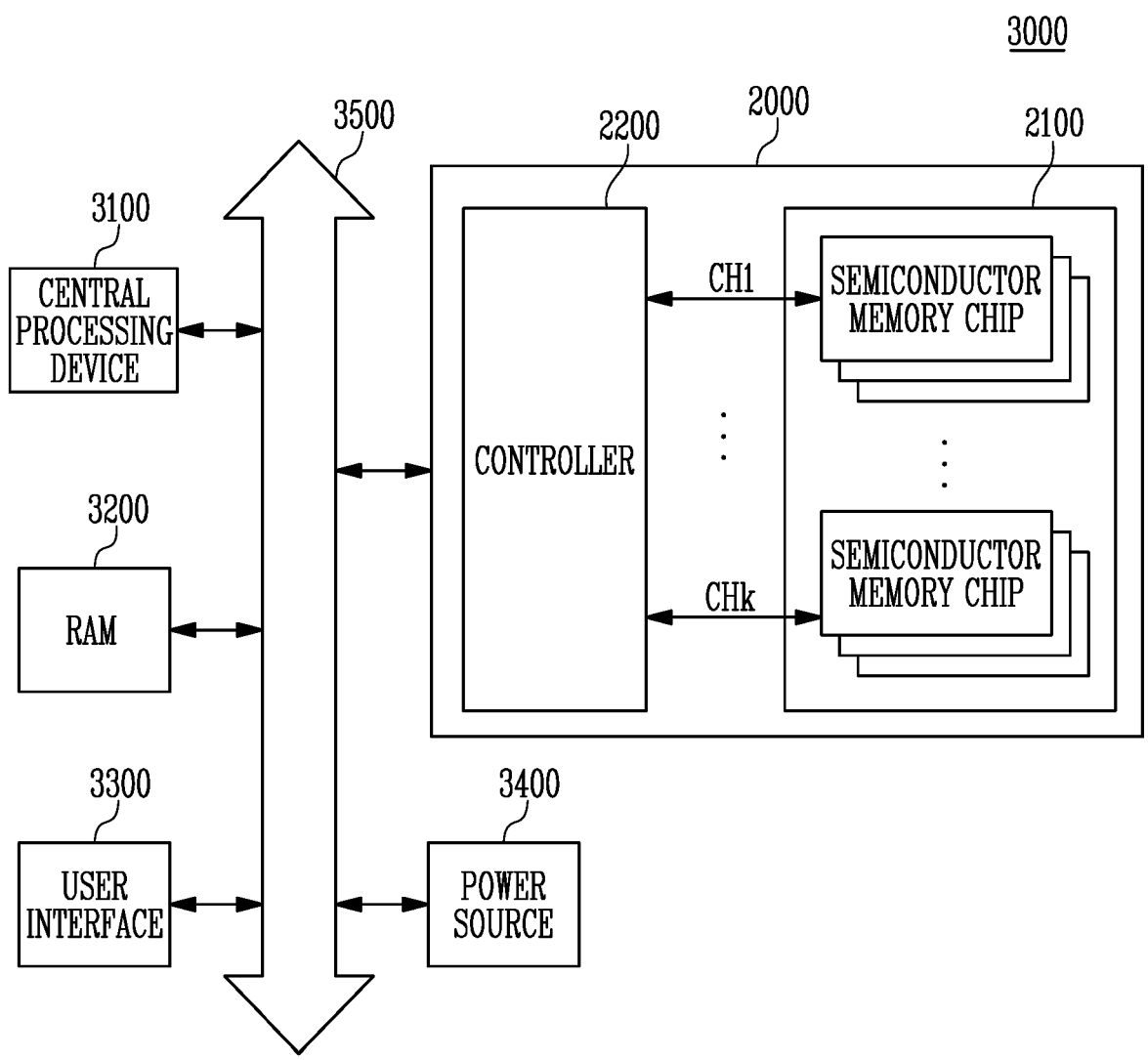
FIG. 20 is a block diagram illustrating a computing system including the memory system described with reference to FIG. 19 according to an embodiment of the present disclosure.

FIG. 20 is a block diagram illustrating a computing system 3000 including the memory system described with reference to FIG. 19 according to an embodiment of the present disclosure.

Referring to FIG. 20, the computing system 3000 includes a central processing device 3100, a random access memory (RAM) 3200, a user interface 3300, a power source 3400, a system bus 3500, and the memory system 2000.

The memory system 2000 is electrically connected to the central processing device 3100, the RAM 3200, the user interface 3300, and the power source 3400 through the system bus 3500. Data provided through the user interface 3300 or processed by the central processing device 3100 is stored in the memory system 2000.

In FIG. 20, the semiconductor memory device 2100 is connected to the system bus 3500 through the controller 2200. However, the semiconductor memory device 2100 may be configured to be directly connected to the system bus 3500. At this time, a function of the controller 2200 is performed by the central processing device 3100 and the RAM 3200.

In FIG. 20, the memory system 2000 described with reference to FIG. 19 is provided. However, the memory system 2000 may be replaced with the memory system including the controller 200 and the semiconductor memory device 100 described with reference to FIG. 18.

The embodiments of the present disclosure and drawings are merely provided with specific examples to easily describe the technical content of the present disclosure and to help understanding of the present disclosure, and are not intended to limit the scope of the present disclosure. It is apparent to those of ordinary skill in the art that other modified examples based on the technical spirit of the present disclosure may be implemented in addition to the embodiments disclosed herein.

The methods, processes, and/or operations described herein may be performed by code or instructions to be executed by a computer, processor, controller, or other signal processing device. The computer, processor, controller, or other signal processing device may be those herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, managers, devices, modules, units, multiplexers, generators, logic, interfaces, decoders, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Although various embodiments of the disclosed technology have been described with particular specifics and varying details for illustrative purposes, those skilled in the art will appreciate that various modifications, additions and substitutions may be made based on what is disclosed or illustrated in the present disclosure and the following claims. Furthermore, the embodiments may be combined to form additional embodiments.

What is claimed is:

1. A method of operating a host communicating with a memory system including a journal area and a data area, the method comprising:
   determining to update old data stored in the memory system;
   transferring, to the memory system, a write command for writing journal data and meta journal data for updating the old data to the journal area; and
   transferring, to the memory system, a write command for writing new data corresponding to the journal data to the data area in response to a write completion of the meta journal data and the journal data received from the memory system,
   wherein the journal data includes first page data and second page data, the first page data includes first partial data and first parity data, and the second page data includes second partial data and second parity data, and wherein the first parity data is generated based on the first partial data, and the second parity data is generated based on the first partial data and the second partial data.

2. The method of claim 1, further comprising:
controlling the memory system to invalidate the old data stored in the data area, in response to a write completion of the new data received from the memory system.

3. The method of claim 1, further comprising:
detecting a sudden power-off of the memory system;
reading meta journal data and journal data stored in the journal area; and
controlling the memory system to recover a write operation before the sudden power-off based on the meta journal data and the journal data.

4. A method of operating a host communicating with a memory system including a journal area and a data area, the method comprising:
detecting a sudden power-off of the memory system;
reading meta journal data and journal data stored in the journal area; and
controlling the memory system to recover a write operation before the sudden power-off, based on the meta journal data and the journal data,
wherein the journal data includes first page data and second page data, the first page data includes first partial data and first parity data, and the second page data includes second partial data and second parity data, and
wherein the first parity data is generated based on the first partial data, and the second parity data is generated based on the first partial data and the second partial data.

5. The method of claim 4,
wherein the controlling of the memory system to recover the write operation before the sudden power-off, based on the meta journal data and the journal data comprises determining whether a parity check of the journal data has passed.

6. The method of claim 5, wherein the controlling of the memory system to recover the write operation before the sudden power-off, based on the meta journal data and the journal data further comprises controlling the memory system to write the journal data of the journal area to the data area, in response to determination that the parity check of the journal data has passed.

7. The method of claim 5, wherein the controlling of the memory system to recover the write operation before the sudden power-off, based on the meta journal data and the journal data further comprises controlling the memory system to delete or invalidate the meta journal data and the journal data of the journal area, in response to determination that the parity check of the journal data has not passed.

8. A method of operating a memory system including a journal area and a data area, the method comprising:
receiving, from a host, write data and a write command; and
writing journal data generated based on the write data in the journal area,
wherein the write data includes first to N-th partial data, the journal data includes first to N-th page data, the i-th page data among the first to N-th page data includes the i-th partial data among the first to N-th partial data and i-th parity data among first to N-th parity data, and the i-th parity data is generated based on at least one of the first to (i−1)-th partial data and the i-th partial data, where N is a natural number greater than 1, and i is a natural number greater than or equal to 1 and less than or equal to N.

9. The method of claim 8, wherein the i-th parity data is generated by a cyclic redundancy check method for at least one of the first to (i−1)-th partial data and the i-th partial data.

10. The method of claim 8, wherein the i-th parity data is generated based on the first to i-th partial data.

11. The method of claim 10, wherein the i-th parity data is generated by a cyclic redundancy check method for the first to i-th partial data.

12. A system comprising:
a host; and
a memory system coupled to the host and including a controller, and a memory device coupled to the controller and including a journal area and a data area,
wherein the controller is configured to control the memory device to:
write journal data and meta journal data in the journal area;
read the journal data and the meta journal data from the journal area when a sudden power-off is detected;
determine whether a parity check of the journal data has passed; and
write the journal data of the journal area to the data area when it is determined that the parity check of the journal data has passed,
wherein the journal data includes first page data and second page data, the first page data includes first partial data and first parity data, and the second page data includes second partial data and second parity data, and
wherein the first parity data is generated based on the first partial data, and the second parity data is generated based on the first partial data and the second partial data.

* * * * *